(12) United States Patent
Ueno et al.

(10) Patent No.: US 8,076,874 B2
(45) Date of Patent: Dec. 13, 2011

(54) ON-VEHICLE ACTUATOR SYSTEM

(75) Inventors: Kentaro Ueno, Hitachinaka (JP); Mitsuhide Sasaki, Hitachinaka (JP); Toshiyuki Innami, Mito (JP)

(73) Assignee: Hitachi, Ltd., Tokyo (JP)

( * ) Notice: Subject to any disclaimer, the term of this patent is extended or adjusted under 35 U.S.C. 154(b) by 626 days.

(21) Appl. No.: 12/180,082

(22) Filed: Jul. 25, 2008

(65) Prior Publication Data

US 2009/0026998 A1   Jan. 29, 2009

(30) Foreign Application Priority Data

Jul. 27, 2007   (JP) .................... 2007-196363

(51) Int. Cl.
*H02P 1/00* (2006.01)
(52) U.S. Cl. ........................ 318/139; 318/140
(58) Field of Classification Search ........... 318/139, 318/140, 727, 798, 801
See application file for complete search history.

(56) References Cited

U.S. PATENT DOCUMENTS

| | | | | |
|---|---|---|---|---|
| 5,650,713 A * | 7/1997 | Takeuchi et al. | ........... | 322/16 |
| 5,941,328 A * | 8/1999 | Lyons et al. | ........... | 180/65.1 |
| 7,215,034 B2 * | 5/2007 | Hino et al. | ........... | 290/40 C |
| 7,482,769 B2 * | 1/2009 | Kutsuna et al. | ........... | 318/254.1 |
| 2005/0035675 A1 * | 2/2005 | Yamaguchi et al. | ........... | 310/68 R |
| 2005/0286181 A1 * | 12/2005 | Ochiai | ........... | 361/23 |
| 2007/0114965 A1 * | 5/2007 | Kutsuna et al. | ........... | 318/807 |

FOREIGN PATENT DOCUMENTS

JP   2006-281992 A   10/2006

* cited by examiner

*Primary Examiner* — Rina Duda
(74) *Attorney, Agent, or Firm* — Crowell & Moring LLP

(57) ABSTRACT

A motor is controlled to always consume power supplied from a power supply system or not to supply power to the power supply system, by performing control to advance or delay a phase of a 3-phase current flowing in the motor or to reduce a percentage of the generated torque with respect to an effective value of the 3-phase current of the motor, or by applying a d-axis current to the motor.

15 Claims, 17 Drawing Sheets

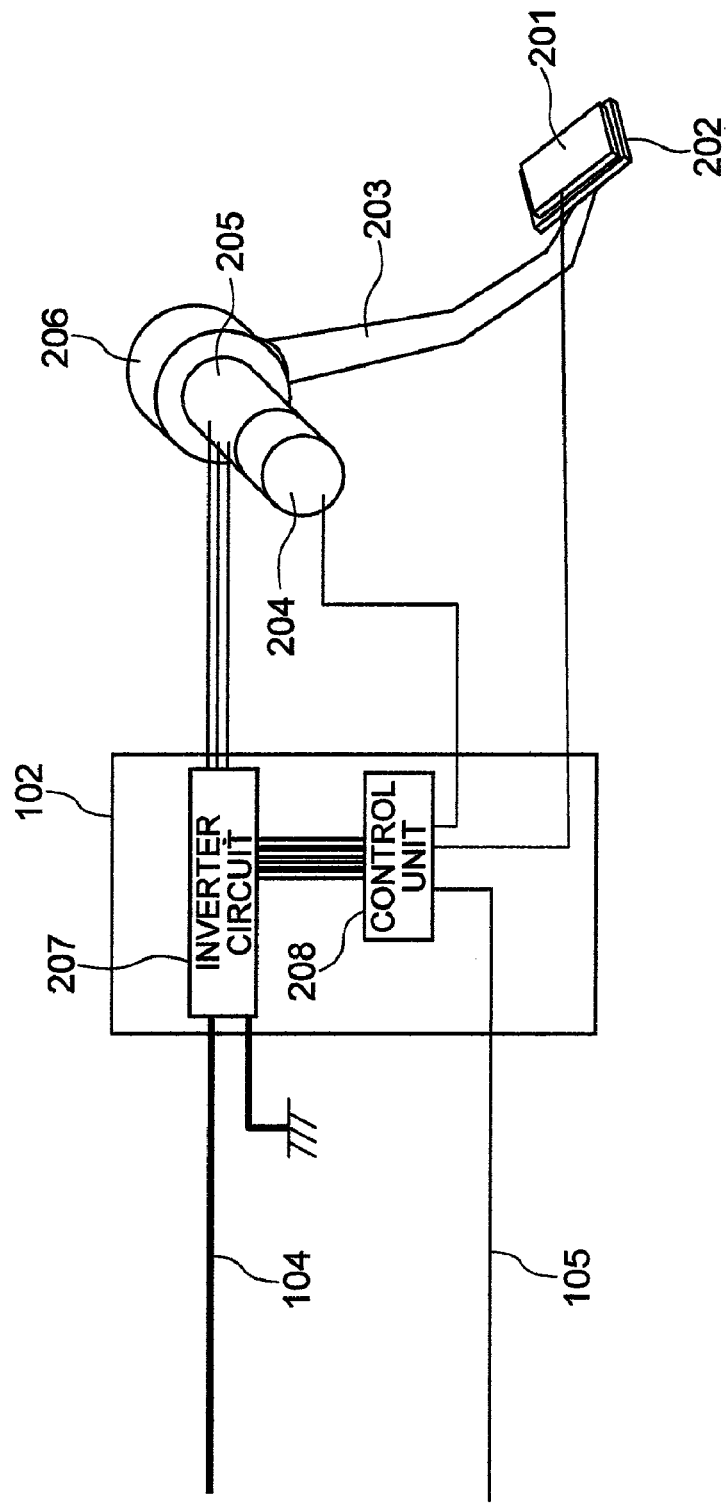

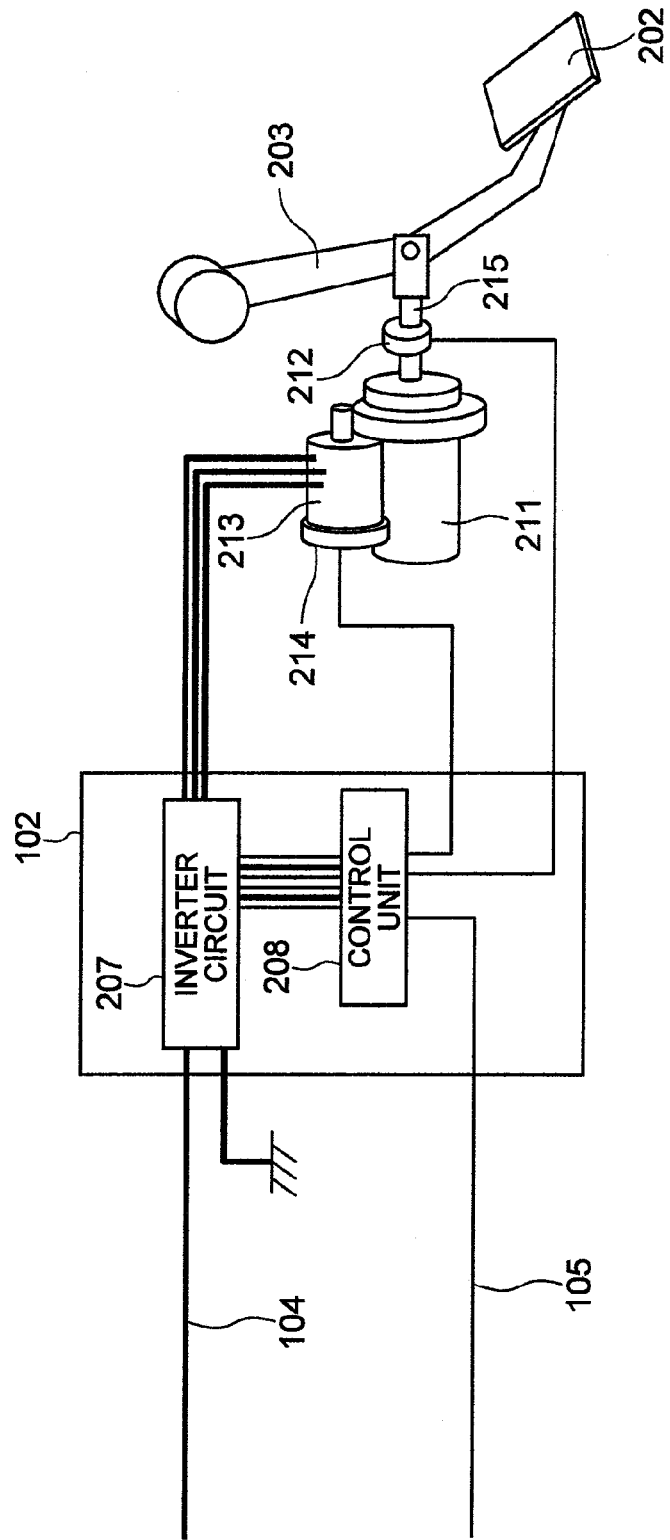

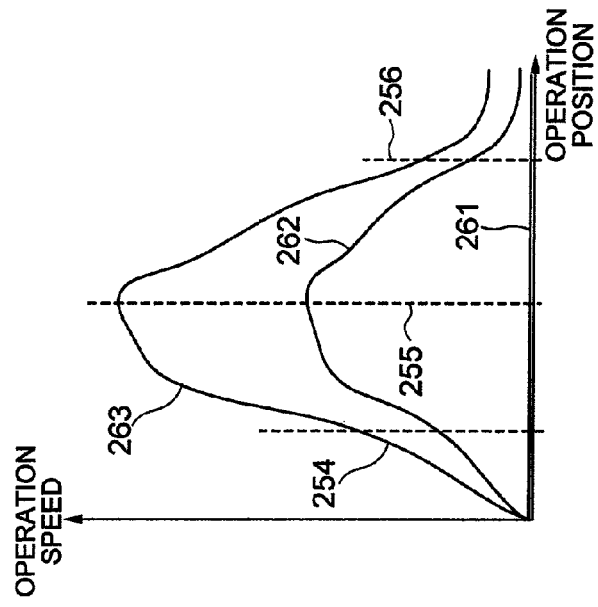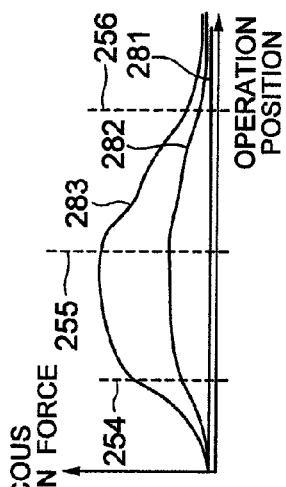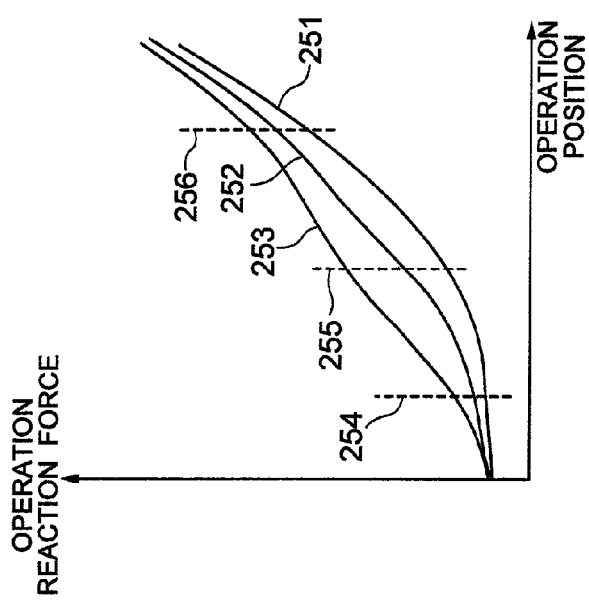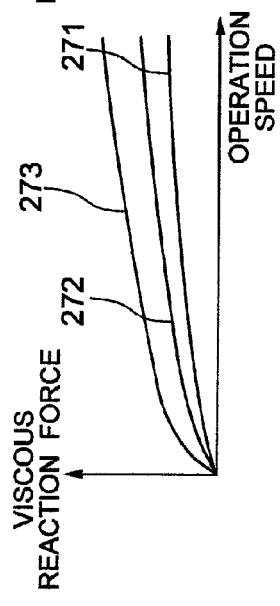

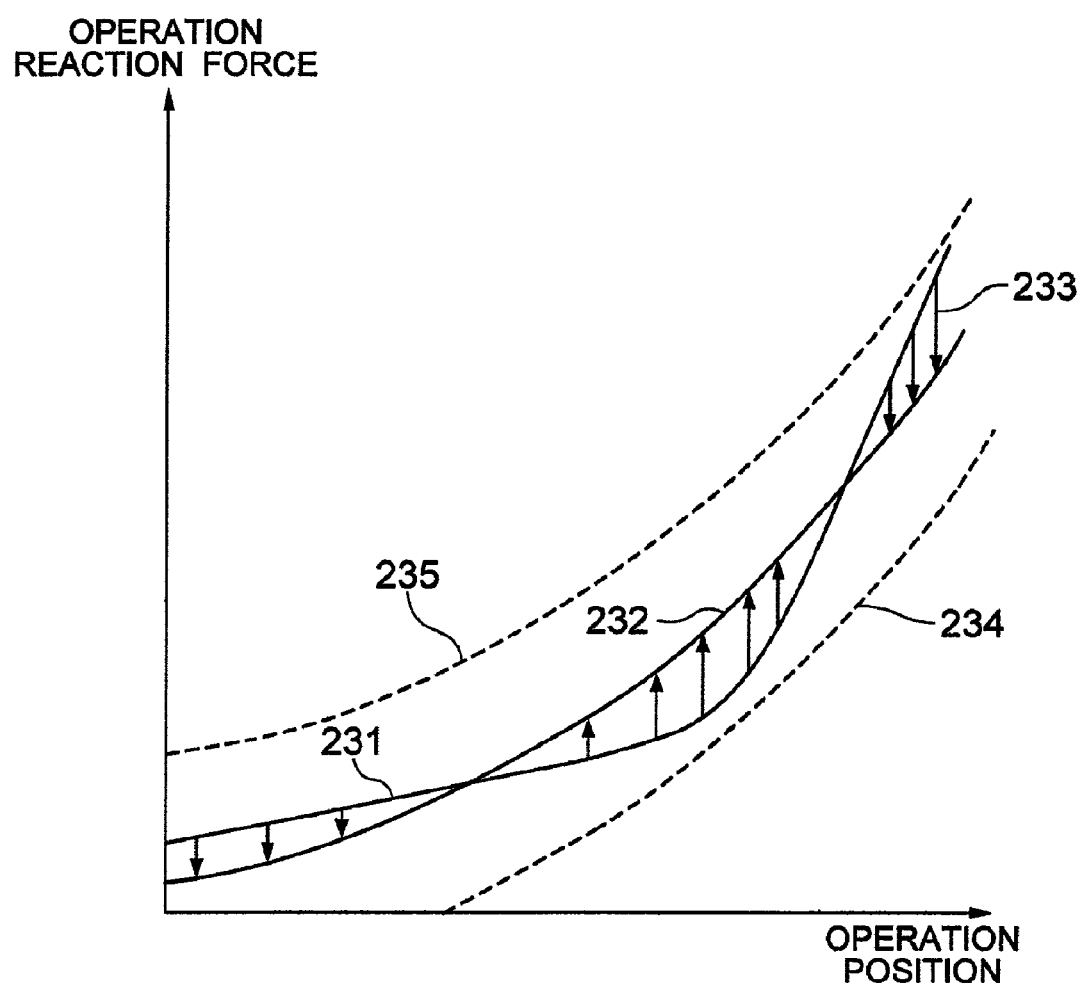

ON-VEHICLE ACTUATOR SYSTEM

BACKGROUND OF THE INVENTION

The present invention relates to an on-vehicle actuator system having a motor driven by a 3-phase current.

As electronic and control technologies advance rapidly in recent years, a by-wire technology has been developed that can control an output mechanism on a vehicle side independently of an input mechanism on a driver's side during operations that determine vehicle actions such as driving, braking and steering. Since it can electronically control a relation between the driver's operations and vehicle movements, the by-wire technology can improve a feel and an operability when the driver drives a vehicle, thereby reducing fatigue of the driver. Independently of an intention of the driver, the by-wire technology can automatically apply brakes, run the vehicle at a constant speed, keep a constant distance from another car running in front and make the vehicle run along a traffic lane. It can also control an output of conventional output mechanisms to cooperate with a regeneration function not available conventionally.

Most of actuators based on the by-wire technology comprise a high-torque, high-speed motor. Car-mounted actuator systems using a motor that have been developed so far include a pedal device that generates a reactive force by a motor, a motor-driven brake that generates a thrust to press a frictional material against a brake rotor, and a motor-driven booster that generates a hydraulic pressure in a master cylinder according to a degree the driver steps on the brake. For example, JP-A-2006-281992 discloses an electric booster that can precisely estimate an input thrust to an input member by using a displacement sensor and, based on the estimated input thrust, drive the motor-driven actuator to improve a pedal feel by incorporating a jump-in characteristic when a brake pedal is slightly stepped on and to appropriately perform a brake assist control when a large input is applied to a brake pedal.

SUMMARY OF THE INVENTION

Motors are generally controlled by driving switching devices with a pulse width modulation. An inverter circuit including a plurality of switching devices is supplied electricity from a vehicle power supply system but, when a motor functions as an electric generator or regenerative device, supplies electricity to the vehicle power system. The vehicle power supply system may be constructed of a DC-DC converter to adjust a motor application voltage, or a diode may be installed between the vehicle power supply system and the inverter circuit to avoid failures caused by a capacitor ground fault in the inverter circuit or by a wrong connection between positive and negative terminals. Where the vehicle power supply system is constructed of a DC-DC converter, or where there is a diode between the vehicle power supply system and the inverter circuit, the vehicle power supply system may not be able to absorb electricity generated by the motor. Further, even if the vehicle power supply system has a battery or capacitor, it may not be able to absorb the electricity produced by the motor because of insufficient storage capacity of the battery and capacitor.

If the vehicle power supply system cannot absorb electricity generated by the motor, current cannot flow, resulting in the motor not being able to produce a torque. Even if the vehicle power supply system can absorb the generated electricity, a situation may occur where the motor torque and current cannot be made small when the motor is rotated at high speed by external forces. The on-vehicle motor-driven actuator system is required to statically hold a generated torque, to dynamically change the torque during high-speed revolution, and to change the torque by rotating the motor by external forces. Thus the torque needs to be controlled at a desired value irrespective of the revolution speed and therefore eliminating limitations on a control range of torque and current has been a task that needs to be resolved.

Further, the on-vehicle motor-driven actuator system frequently changes its state among a high-speed revolution state, a low-speed revolution state and a rest state, so that a large current often flows from the inverter circuit to the vehicle power supply system. This may suddenly change a voltage of the vehicle power supply system or generate noise by electromagnetic waves, giving rise to a possibility of having adverse effects on the vehicle power supply system and on other systems near the on-vehicle actuator system. This problem has also constituted one of the tasks that need to be dealt with.

To solve the above and other problems, an example of the on-vehicle actuator system of this invention comprises: a motor driven by a 3-phase current; an inverter circuit having switching devices to drive the motor; a power supply system connected to the inverter circuit to supply electricity to the motor and the inverter circuit; and a control unit to control a current or voltage applied to the motor by controlling an operation of the switching devices; wherein the control unit controls the motor so that the motor is always supplied an electricity from the power supply system or that the motor does not supply an electricity to the power supply system at all.

Another example of the on-vehicle actuator system of this invention comprises: a motor driven by a 3-phase current; an inverter circuit having switching devices to drive the motor; a power supply system connected to the inverter circuit to supply electricity to the motor and the inverter circuit; and a control unit to control a current or voltage applied to the motor by controlling an operation of the switching devices; wherein the control unit controls the motor so that the motor does not generate or regenerate power at all.

Another example of the on-vehicle actuator system of this invention comprises: a motor driven by a 3-phase current; an inverter circuit having switching devices to drive the motor; a power supply system connected to the inverter circuit to supply electricity to the motor and the inverter circuit; and a control unit to control a current or voltage applied to the motor by controlling an operation of the switching devices; wherein the control unit calculates power of the motor and controls the motor so that the motor consumes power at all times or that its power consumption does not become negative at all.

Another example of the on-vehicle actuator system of this invention is characterized in that, in addition to the above characteristics, when the motor is generating a torque or force in a direction that reduces a revolution speed of the motor, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, when the motor is rotating in a direction opposite that of the torque or force being generated by the motor, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, when the control unit checks, based on a q-axis current of the motor and a revolution speed of the motor, whether the motor is about to generate or regenerate power and when the control unit has decided that the motor is about to generate or regenerate power, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, a semiconductor is provided between the inverter circuit and the power supply system to prevent a current from flowing from the inverter circuit to the power supply system.

Another example of the on-vehicle actuator system of this invention is characterized in that, in addition to the above characteristics, the power supply system can step up or step down an electricity from other power supply systems and supply it to the inverter circuit but cannot supply an electricity from the inverter circuit to the other power supply systems.

Another example of the on-vehicle actuator system of this invention is characterized in that, in addition to the above characteristics, the motor is provided in an operation input device or a vehicle output device; that the control unit statically generates a force or torque based on a magnitude of an operation input or vehicle output and dynamically generates a force or torque based on an amount of change in the operation input or vehicle output; and that the control unit controls a desired force or torque of the motor by a revolution speed.

Another example of the on-vehicle actuator system of this invention is characterized in that, in addition to the above characteristics, the motor is provided in an operation input device or a vehicle output device; and that the motor is applied an external force from members making up the system, a human force or an external force from other actuator systems and, when the control by the inverter circuit is not performed, is rotated by the external force.

Another example of the on-vehicle actuator system of this invention is characterized in that, in addition to the above characteristics, when the motor is rotated by an external force in the same direction as the external force and generates a force or torque opposing the external force, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, when a product of a torque and a revolution speed of the motor is negative and is greater than a predetermined threshold in a negative direction, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, when a product of a q-axis current of the motor and a revolution speed of the motor is negative and is greater than a predetermined threshold in a negative direction, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, when the motor is rotated by an external force and when the control unit is controlling the motor to make a revolution speed of the motor slower than that when no current is applied to the motor, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, when the operation input unit is a pedal and when a product of a pedal step-on speed and a pedal reactionary force is negative and is greater than a predetermined threshold in a negative direction, the control unit performs control to advance or delay a phase of the 3-phase current flowing in the motor or to reduce a percentage of the generated torque with respect to an effective value of the 3-phase current of the motor, or applies a d-axis current to the motor.

Another example of the on-vehicle actuator system of this invention is characterized in that, in addition to the above characteristics, the pedal is a brake pedal or accelerator pedal and the motor primarily generates a pedal reactionary force.

Another example of the on-vehicle actuator system of this invention is characterized in that, in addition to the above characteristics, the on-vehicle actuator system is a motor-driven calipers device and the motor primarily generates a braking force.

Another example of the on-vehicle actuator system of this invention is characterized in that, in addition to the above characteristics, the on-vehicle actuator system is a motor-driven booster device and the motor primarily generates a braking force.

According to one example of this invention, even when the motor generates or regenerates power, it does not output power to the vehicle power supply system. This makes it possible to construct the system without considering the requirement of the vehicle power supply system being able to absorb power. As a result, even if the motor is rotated by an external force, the torque can be controlled independently of the revolution speed. Even in an operation that frequently switches between high-speed rotation, stop and low-speed rotation, power does not flow from the inverter circuit to the vehicle power supply system, thus minimizing a possibility of adversely affecting the vehicle power supply system and other systems surrounding the on-vehicle actuator system.

Other objects, features and advantages of the invention will become apparent from the following description of the embodiments of the invention taken in conjunction with the accompanying drawings.

BRIEF DESCRIPTION OF THE DRAWINGS

FIG. 2 is a schematic diagram showing an example of an operation input device in embodiment 1 of this invention.

FIG. 3 is a schematic diagram showing another example of the operation input device in embodiment 1 of this invention.

FIGS. 4A-4D show an example of operation reaction force of the operation input device of embodiment 1.

FIG. 6 shows an example relation between an operation position and an operation reactionary force of the operation input device.

DETAILED DESCRIPTION OF THE EMBODIMENTS

Some preferred embodiments implementing the present invention will be described by referring to the accompanying drawings.

Embodiment 1

Figure 1:
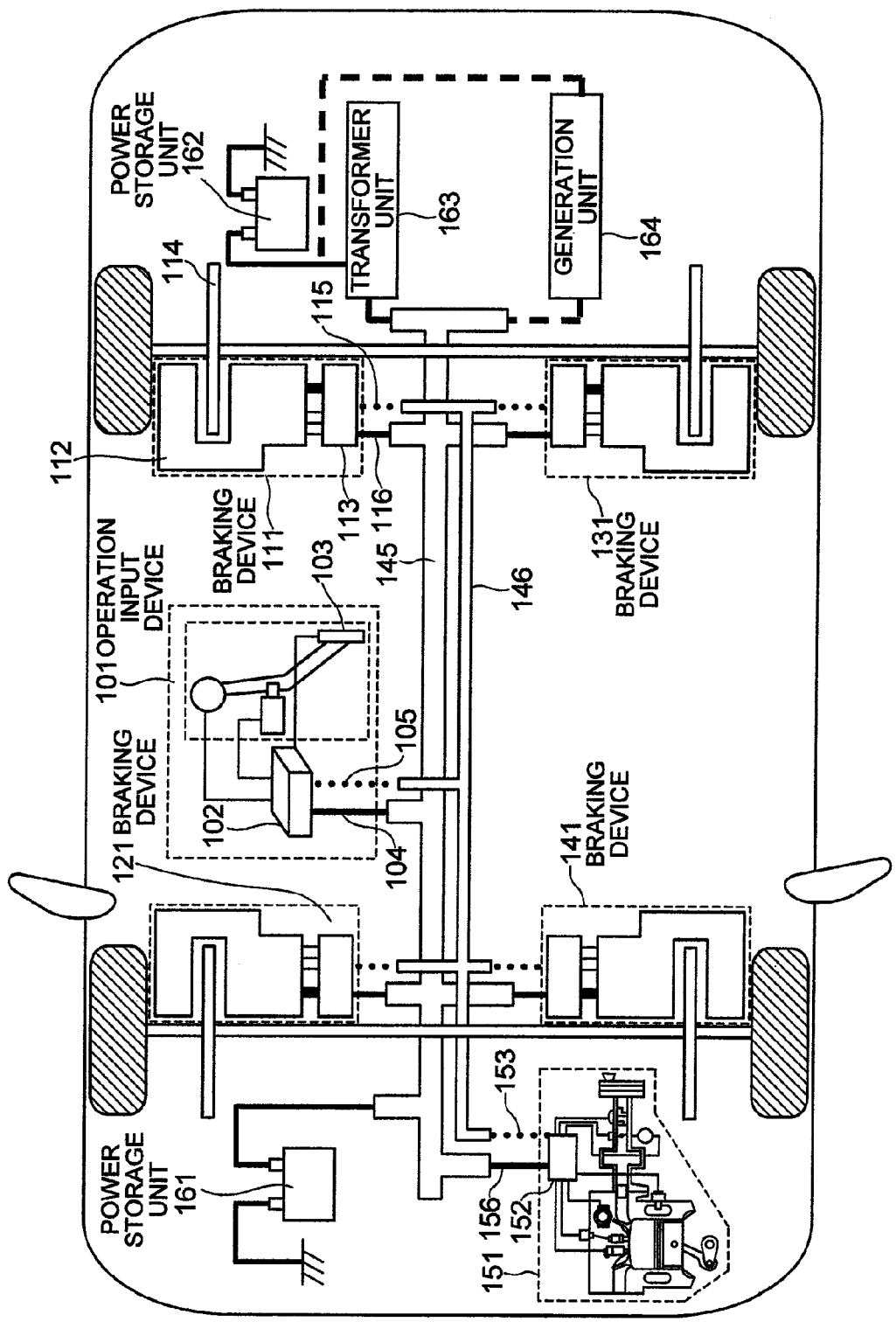
FIG. 1 is a schematic diagram of a system as embodiment 1 of this invention.

FIG. 1 schematically shows a vehicle system having an operation input device, one form of the on-vehicle actuator system of this invention. Reference number 101 represents an operation input device to be operated by a driver to drive the vehicle. It has an operation input unit 103 and a controller 102. The operation input device 101 can generate an operation reactionary force by a motor and also change it arbitrarily. The controller 102 receives or supplies electricity through a power supply wire 104 connected to a vehicle power supply system 145 and controls current and voltage of a motor of the operation input unit 103. The controller 102 also transmits information from the operation input device 101 to a vehicle output device via a communication path 105.

The operation input device 101 is not limited to a pedal device whose pedal position and pedal speed are changed by a force that the driver applies to the pedal, but may, for example, be a steering device whose steering angle and steering angular speed are changed by a steering wheel turning force. Here, all these inputs the driver applies to the operation input device are defined to be an "operation input". The "operation input" may include such information as "operation force", "operation position" and "operation speed".

The operation input device 101 changes its operation position and operation speed depending on the operation force. It also generates an operation reactionary force according to the operation position and operation speed. The operation reactionary force produced in opposition to the operation force gives the driver an operation feel. In the operation input device 101, the relation between the operation position or operation speed and the operation reactionary force or operation force can be realized to have a desired characteristic by means of an electric control.

The "operation position" is equivalent to a stroke or distance that the operation input device is operated. The "operation position" may be replaced with an "operation stroke" or simply "stroke". If the operation input device is a pedal device, the operation position may be replaced with a "pedal position" or "pedal stroke". Also, if the operation input device is a steering device, it may be replaced with a "steering angle".

The "operation speed" may be referred to as a "stroke speed". If the operation input device is a pedal device, it may be referred to as a "pedal speed" or "pedal stroke speed". Also, if the operation input device is a steering device, it may be replaced with a "steering angular speed". The operation speed can be calculated from the operation position by differentiating an operation position displacement per unit time.

The "operation force" is a force that the driver applies to the operation input device in order to move the operation input device. If the operation input device is a pedal device, it refers to a "stepping force" or "foot-applied force". If the operation input device is a steering device, it corresponds to a "steering force".

The "operation reactionary force" is a force that the operation input device imparts to the driver when he or she operates the operation input unit. If the operation input device is a pedal device, it corresponds to a "pedal reactionary force". And if the operation input device is a steering device, it corresponds to a "steering reactionary force". The "operation reactionary force" may be replaced simply with a "reactionary force". The operation reactionary force is a force paired with an operation force and generally opposite in direction to the latter. Here the operation force and the operation reactionary force are treated as equivalent forces.

Next, an output that affects the vehicle motion is defined as a "vehicle output". The vehicle output includes, for example, a "braking force" that decelerates a vehicle, a "driving force" that accelerates it or a "rotational force" that turns the direction of travel of the vehicle.

Reference numbers 111, 121, 131, 141, 151 can call be said to represent vehicle output devices. Of these, 111, 121, 131 and 141 represent braking devices to generate braking forces for the vehicle. Denoted 151 is a drive source to generate a driving or motive force. The operation input device and the vehicle output device are connected together for electric signal interchange.

The operation input given to the operation input device is transmitted as an electric signal to the vehicle output device which, based on the received signal information, generates a vehicle output. The operation input device and the vehicle output device are connected in such a way that there is no mechanical connection or that if they have a mechanical connection, there is no or little mechanical interference between them during normal operation. So, the control of the operation position and operation reactionary force in the operation input device can be performed independently of the control of the vehicle output in the vehicle output device.

In embodiment 1 of FIG. 1, the operation input device 101 is a brake pedal device, so the corresponding vehicle output device is braking devices 111, 121, 131, 141. If the operation input device 101 is an accelerator pedal, the corresponding vehicle output device is a drive source 151.

The braking devices 111, 121, 131, 141 of FIG. 1 are electric calipers devices. The braking device 111 has an electric calipers 112 and a braking device 113. The electric calipers 112 moves a piston by a motor to press pads against a brake rotor 114 to generate a braking force for the vehicle.

The braking device 113 receives electricity from a power supply wire 116 connected to a vehicle power supply system 145 to control current and voltage of the motor of the braking device 111. The braking device 113 also controls the motor of the braking device 111 based on instructions conveyed from the operation input device 101 through the communication path 115 and on information in the braking device 111. Although the embodiment of FIG. 1 has shown the electric calipers 112 and the braking device 113 as separate devices, they may be constructed as an integral device. Other braking devices 121, 131, 141 have the similar fundamental construction to that of the braking device 111. The braking device 111 is mounted on a rear right-side wheel of the vehicle, the braking device 121 on a front right-side wheel, the braking device 131 on the rear left-side wheel, and the braking device 141 on the front left-side wheel.

Denoted 151 is a drive source to generate a motive force for the vehicle. While the drive source in the embodiment of FIG. 1 is shown to be an internal combustion engine, it may be an electric motor or a hybrid system of engine and motor.

Designated 152 is a controller that receives electricity from the power supply wire 156 connected to the vehicle power supply system 145 and controls the drive source based on instructions transmitted from the operation input device 101 through a communication path 153 and on information in the drive source 151.

Denoted 161 is a power storage unit that supplies or receives electricity to and from the vehicle power supply system 145. The power storage unit 161 may be a battery or a large capacitor. Another power storage unit 162 supplies electricity to the vehicle power supply system 145 and, when its voltage differs from that of the vehicle power supply system 145, is connected to the vehicle power supply system 145 through a transformer unit 163. The power storage unit 162 may be a battery or a large capacitor. When there is the power storage unit 162, the power storage unit 161 may or may not be provided. Likewise, if there is the power storage unit 161, the power storage unit 162 may or may not be provided. The transformer unit 163 can transform voltage so that the vehicle power supply system 145 can supply electricity to the power storage unit 162. The transformer unit 163 also may or may not be able to transform the voltage so that the vehicle power supply system 145 can supply electricity to the power storage unit 162.

Denoted 164 is a generation unit that generates electricity of the same voltage as that of the vehicle power supply system 145 or power storage unit 162. If the generation unit 164 is at the same voltage as the vehicle power supply system 145, it directly connects to the vehicle power supply system 145. Also, if the generation unit 164 is at the same voltage as the power storage unit 162, it connects to the vehicle power supply system 145 through the transformer unit 163. It is also possible to provide two generation units, one directly connected to the vehicle power supply system 145 and the other connected to the vehicle power supply system 145 through the transformer unit 163.

If the drive source 151 is an internal combustion engine, the generation unit 164 for supplying electricity to the vehicle transforms a rotary energy of the engine into an electric power and may be an alternator. If the drive source 151 is a motor, the generation unit 164 may or may not be provided because the drive source itself can generate electricity.

A vehicle communication system 146 is an information path connecting the operation input device and the vehicle output devices to transfer electric signals between them and is physically formed of electric wires. The operation input device and the vehicle output device are often installed at spatially remote locations, so control information is transferred through the vehicle communication system 146 generally using electric signals of a time-division multiplex communication system. The electric signals used by the vehicle communication system 146 may be of a serial communication type or a multiplex communication type such as CAN, Flax Ray and LAN.

The vehicle power supply system 145 and the vehicle communication system 146 may be duplicated in case of a failure. For example, the vehicle power supply system 145 may comprise two independent systems, each having a power storage unit or a generation unit that both work as a power source. The vehicle communication system 146 may also comprise two independent systems. It is also possible to have each of the power supply system and the communication system divided into a system to which the braking devices 111, 141 belong and a system to which the braking devices 121, 131 belong, with the operation input device 101 receiving electricity independently of both of the systems and transmitting signals independent of the both system.

If the power supply system and the communication system are duplicated, reliability of the duplicated system can be secured. The operation input device 101 is connected to both systems and configured such that one of the two systems remains operational if the other system should fail. The duplication may be configured as a front and rear duplicated system in which the braking devices 121, 141 are connected to one system and the braking devices 111, 131 to the other system.

FIG. 2 shows an example of the operation input device 101 of FIG. 1. It has a controller 102 and an electrically controllable motor 205 which is driven by a 3-phase current. The motor 205 may be a synchronous motor or an induction motor or a DC brushless motor.

When a current flows in the motor 205, whether the motor generates or consumes electricity, a member 203 rotates about a rotating shaft or a rotary force is generated. The controller 102 has an inverter circuit 207 to generate a 3-phase current to drive the motor 205 and a control unit 208 to control the inverter circuit 207. The inverter circuit 207 transforms a DC current supplied from the power supply wire 104 by switching devices, the number of which is six or a multiple of 6, into a 3-phase current to drive the motor 205.

The controller 102 controls the motor 205 to control the operation position, operation speed and operation reactionary force of the operation input device to desired values. The controller 102 also transmits operation input information and vehicle output instructions to the vehicle output device through the communication path 105 to cause the vehicle output device to generate vehicle outputs according to the operation inputs.

The operation input device 101 has an operation input unit 202 that works as a step-on member. When the operation input unit 202 is stepped on, the operation input unit 202 and the member 203 are moved.

The "operation position" is assumed to increase in value as it moves from the near side to the far side and decrease in value as it moves from the far side to the near side. If the operation input device is a pedal, when the pedal is moved from the far side (depressed state) to the near side (released state), it is referred to as "being lifted" or "being returned". When the pedal is held as is so as to keep its position, the pedal is said to be "held". In a general pedal device, the pedal position at the end of its maximum stroke is about 0.03-0.1 m.

The operation input device has an operation quantity detection unit 204 an operation force detection unit 201. The operation quantity detection unit 204 detects an operation position or an operation speed as the operation quantity. The operation quantity that the operation quantity detection unit 204 detects may be an amount that the member 203 rotates about the rotating shaft and an amount that the operation input unit 202 moves or strokes. The operation quantity detection unit 204 may detect the operation speed either directly or by calculating it based on the operation position.

The operation quantity detection unit 204 may use a motor control sensor that detects a rotation angle or a rotation phase of the motor 205. The motor control sensor may be an encoder or resolver using light or magnetism. The operation quantity detection unit 204 may also be a rotary angle sensor that can detect an angle through which the member 203 has rotated about the rotating shaft. The rotary angle sensor may be a potentiometer or rotary encoder using a variable resistor, a device using a rotary slit to detect the angle by an optical pickup, or a device using a magnetic element to detect a change in magnetism. Further, the operation quantity detection unit 204 may be a stroke sensor that can detect an amount of stroke or an operation position of the member 203 or the operation input unit 202. The stroke sensor may be a potentiometer using a variable resistor or a device using a magnetic circuit to detect a change in magnetic resistance as a displacement.

The operation force detection unit 201 detects a stepping force as an operation force and also a pedal reaction force as an operation reactionary force. Here, the operation force detection unit 201, since it is designed to detect a force, detects both the operation force and the operation reactionary force as the same. The force detected by the operation force detection unit 201 may be a force applied to cause the member 203 to rotate about the rotating shaft or a force applied to cause the operation input unit 202 to move or stroke. The operation force detection unit 201 may also be such as will detect a force by using a resistance change in a strain gauge.

The motor 205 is connected to the operation input device through a reduction gear 206. The reduction gear 206 may be constructed of spur gears or of planetary gears or differential gears.

FIG. 3 shows another example of the operation input device 101 of FIG. 1. This example has a rotary-linear motion conversion mechanism 211, which transforms the rotary motion of a motor 213 into a linear motion, pushing and pulling a rod 215. The linear motion or linear force of the rod 215 determines the operation position, operation speed and operation force of the member 203. The rotary-linear motion conversion mechanism 211 may use a ball screw, a trapezoidal screw, or other mechanism. The operation force is detected by a force sensor 212. The force sensor 212 is identical to an example operation force detection unit 201 shown in FIG. 2. The operation position and operation speed are detected by a rotary sensor 214 of the motor 213. The rotary sensor 214 is identical to an example operation quantity detection unit 204 shown in FIG. 2.

The operation input device 101 produces an appropriate operation reaction force by the controller 102 controlling the motor. The operation reactionary force can be divided into a stiffness reactionary force and a viscosity reactionary force, as expressed by equation 1.

$$\text{pedal reactionary force} = \text{stiffness reaction force} + \text{viscosity reaction force} \quad \text{(Equation 1)}$$

The stiffness reaction force is a reaction force that changes in magnitude according to the operation position. As the operation position increases, the stiffness reaction force also increases. An operation input device with a larger stiffness reaction force for the same operation position gives an operator a firm or rigid feel during operation. On the contrary, an operation input device with a smaller stiffness reaction force for the same operation position gives the operator a soft feel.

The viscosity reaction force is a reaction force that changes in magnitude according to the operation speed. It increases with the operation speed. An operation input device with a larger viscosity reaction force for the same operation speed gives a viscous feel during operation. An operation input device with a smaller viscosity reaction force for the same operation speed gives a strong spring-like feel.

FIGS. 4A-4D show one example of operation reactionary forces generated by the operation input device 101. In FIG. 4A, characteristic line 251 represents an operation reactionary force when the operation speed is nearly zero and lines 252 and 253 represent operation reactionary forces when the operation speeds differ. In FIG. 4B, 261 represents a case where the operation speed is very slow. The operation reactionary force in this case is 251 of FIG. 4A. 251 nearly corresponds to the stiffness reaction force in Equation 1. When the operation speed is fast, the viscosity reaction force is large and therefore the operation reactionary force is also large. Since line 251 almost corresponds to the stiffness reaction force, when the operation speed increases as in line 262 or even 263 of FIG. 4B, the difference in FIG. 4A corresponds to the viscosity reaction force in Equation 1.

FIG. 4C and FIG. 4D show viscosity reaction forces that change according to the operation speed and the operation position. In FIG. 4C, line 271 represents one example relation between the viscosity reaction force and the operation speed at the operation position 254. Similarly, lines 272 and 273 represent example relations between the viscosity reaction force and the operation speed at the operation positions 255 and 256, respectively. In FIG. 4D, line 281 represents a viscosity reaction force for the operation speed of 261, which is shown to be very small. Similarly, lines 282 and 283 represent viscosity reaction forces for operation speeds of 272 and 273, respectively.

The motor generates a torque required to produce an operation reactionary force in the operation input device. To generate a torque in the motor requires applying a current to the motor. For that purpose, the controller 102 controls current flowing in the motor to generate operation reactionary forces shown in FIGS. 4A-4D.

In the motor driven by 3-phase current, a torque generating current is a q-axis current. The q-axis current of the motor controlled by the controller 102 is given by the following equation 2.

$$q\text{-axis current} = K1 \times (\text{target operation reactionary force} - \text{operation force} + \text{resistive force of mechanism}) + \text{current used for acceleration and deceleration} \quad \text{(Equation 2)}$$

In the above equation, "K1" is a proportional constant determined by a torque constant of the motor and a reduction ratio of the operation input device; and "resistive force of mechanism" is a resistive force that depends on a friction of sliding portions of the operation input device and an efficiency of the reduction gear and which includes a reaction force produced by deformations of the operation input device and, when a spring-element mechanism is used in the operation input device, also includes its reaction force.

Figure 5A:
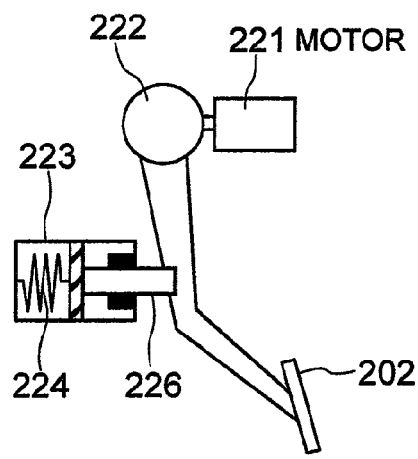
FIGS. 5A-5D show an example of an operation input device with a passive reaction unit.
Figure 5B:
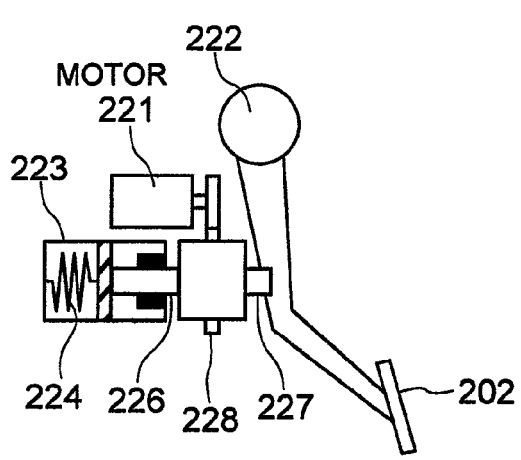
Figure 5C:
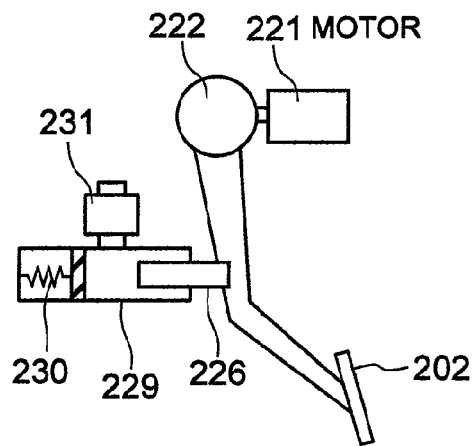
Figure 5D:
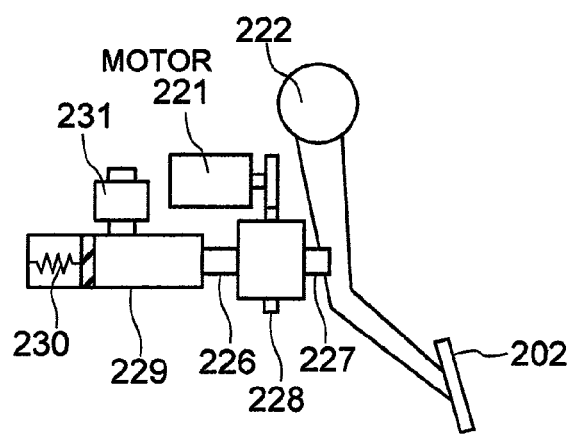

FIGS. 5A-5D show a variety of forms of operation input device with a passive reactionary force unit as a means of generating an operation reactionary force. In FIGS. 5A and 5B, the passive reactionary force unit 223 generates a spring reactionary force in a rod 226 by a spring 224 to generate an operation reactionary force in the operation input unit 202. In FIGS. 5C and 5D, a passive reactionary force unit 229 generates a spring reactionary force and a hydraulic reactionary force in the rod 226 by a spring 230 and a hydraulic circuit 231 to generate an operation reactionary force in the operation input unit 202. In FIGS. 5A and 5C, the motor 221 generates a torque in a rotating shaft 222 to generate an operation reactionary force in the operation input unit 202. In FIGS. 5B and 5D, the torque of the motor 221 is transformed by a rotary-linear motion conversion mechanism 228 into a linear force which is then combined with the reactionary force of the rod 226 before being transmitted to a rod 227 to become an operation reactionary force in the operation input unit 202.

All of the operation input devices of FIGS. 5A-5D can generate a pedal reactionary force of the motor and the passive reactionary force unit combined. The reactionary force (passive reactionary force) generated by the passive reactionary force unit is determined by a mechanical characteristic of the passive reactionary force unit and cannot be controlled electrically. But by either adding or subtracting an operation reactionary force of the electrically controllable motor (motor reactionary force), an overall operation reactionary force can be generated as required.

FIG. 6 shows an example relation between the operation position and the operation reactionary force of the operation input device. Line 231 represents a passive reactionary force. The passive reactionary force is not changed by electrical factors and increases with the operation position. On the other hand, a range in which the operation reactionary force can be changed by the motor reactionary force remains constant irrespective of the operation position. Thus, an overall operation reactionary force can be controlled in a range equivalent to the range of the motor reactionary force centered on line 231. In FIG. 6, if it is assumed that line 234 represents a minimum value of the operation reactionary force and line 235 represents a maximum value of the operation reactionary force, line 232 represents a desired operation reactionary force realized by controlling the motor reactionary force. When the operation reactionary force is line 232, arrow 233 indicates the controlled motor reactionary force. When the operation reactionary force is greater than the passive reactionary force, the motor reactionary force is positive. When the operation reactionary force is smaller than the passive reactionary force, the motor reactionary force is negative.

Generally, the range of suitable characteristic of the operation reactionary force for the operation input device is already determined to some degree. So, rather than supplying all of the operation reactionary force from the motor reactionary force, the passive reactionary force is utilized to make the motor reactionary force variable between the minimum-value line 234 and the maximum-value line 235 of FIG. 6 to realize a desired operation reactionary force, making it possible to minimize the capacity and size of the motor and reduce its power consumption.

In the operation input device with a passive reactionary force unit, the q-axis current of the motor controlled by the controller 102 is given by the following Equation 3.

q-axis current=K1×(target operation reactionary force−operation force+passive reactionary force+mechanism resistive force)+current used for acceleration and deceleration (Equation 3)

Figure 7:
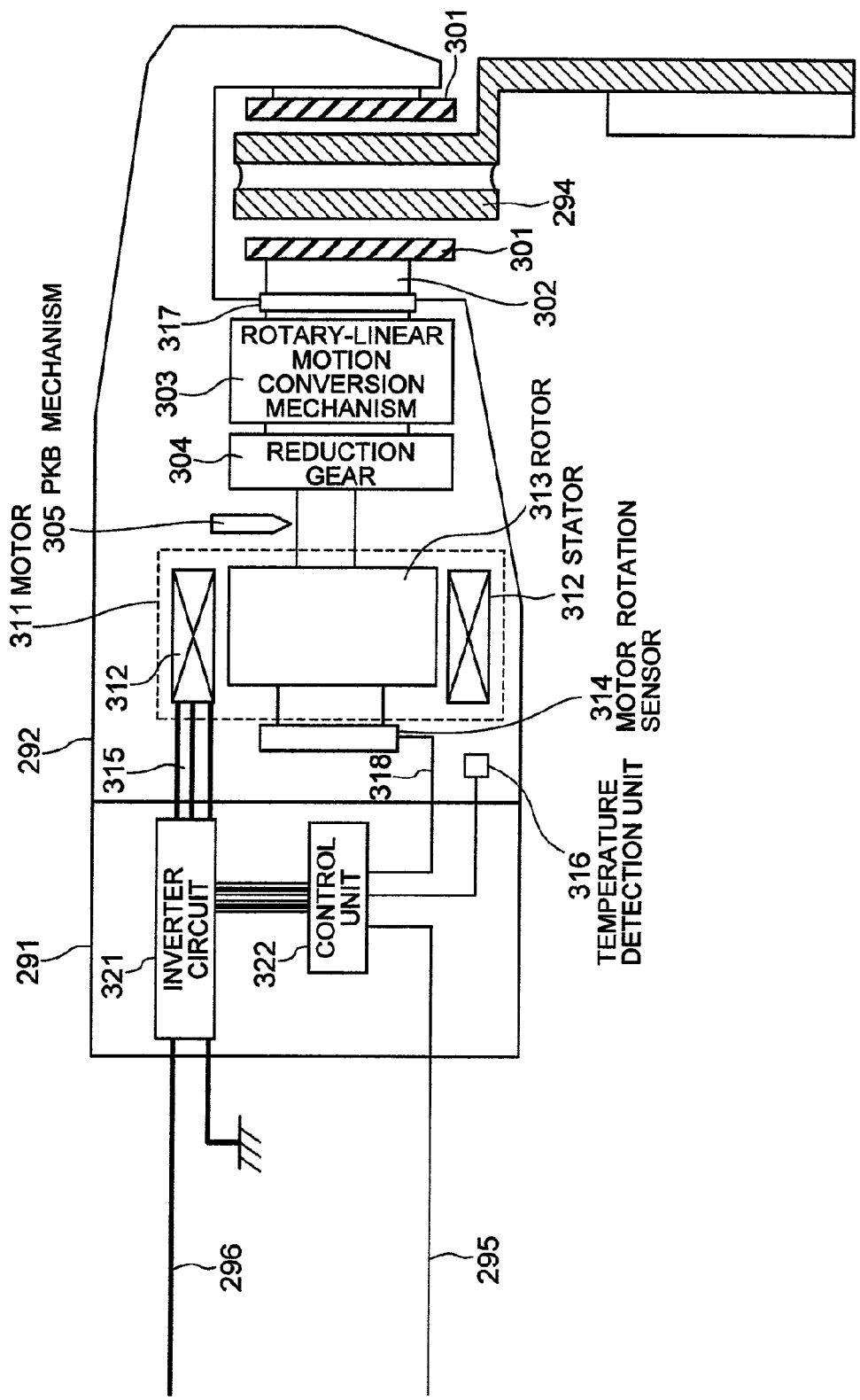
FIG. 7 is a schematic diagram showing a motor-driven calipers device, an example of a vehicle output device.

FIG. 7 is a schematic diagram of a motor-driven calipers device, one example of the vehicle output device. Although FIG. 7 shows a calipers output unit 292 and a controller 291 to be integrally coupled together, they may be separated from each other, with the calipers output unit 292 installed on the outside of the vehicle and the controller 291 on the inside. The calipers output unit 292 generates a braking force and a deceleration for the vehicle by a frictional force produced between a brake rotor 294 and pads 301 when the pads are pressed against the rotor. The calipers output unit 292 has a motor 311. The rotation and torque of the motor 311 can move a piston 302 in a pad pressing direction or in a pad parting direction and can also increase or decrease the thrust of the piston.

The rotation of the motor 311 is reduced by a reduction gear 304 to increase the torque and then converted into a linear motion or force by a rotary-linear motion conversion mechanism 303. The rotation of the motor 311 and the displacement of the piston 302 are in a one-to-one relationship, i.e., in a relation uniquely determined by the reduction gear 304 and the rotary-linear motion conversion mechanism 303. The torque of the motor 311 and the thrust of the piston 302 are determined by the reduction gear 304 and the rotary-linear motion conversion mechanism 303 and are in a one-to-one relationship in an ideal condition that does not take into account frictional losses, temperature changes, hysteresis, etc. A quantitative relation between the motor 311 and the piston 302 varies according to the design of the motor 311, reduction gear 304 and rotary-linear motion conversion mechanism 303 and is determined in a variety of ways by voltage and power capacity of the vehicle power supply system, a vehicle weight, a vehicle weight distribution and a driver. Here, the thrust refers to a force with which the piston 302 presses the pads against the rotor, and is equivalent to a pressing force. Further, when the piston 302 is applying a thrust to the pads 301, the pads 301 are also applying a reactionary force of the same magnitude as the thrust to the piston 302.

The motor 311 can be electrically controlled by the controller 291. The motor 311, which is driven by a 3-phase current in this example, may be a synchronous motor, an induction motor or a DC brushless motor. If the motor 311 is a synchronous motor or DC brushless motor, it is constructed of a stator 312 and a rotor 313. The motor rotor 313 has a magnetic member either embedded therein or bonded to its surface and is rotated by a magnetic field generated by the stator 312. The stator 312 is a coil to generate a magnetic field. It produces a revolving magnetic field by a 3-phase current rectified by an inverter circuit 321. Thus, the stator 312 and the inverter circuit 321 are connected by three power supply wires 315.

The controller 291 has a control unit 322, which controls the inverter circuit 321 and a parking brake (PKB) mechanism 305. The PKB mechanism 305 is able to continue holding the thrust generated by the piston 302 even when a power supply to the motor 311 is interrupted. The inverter circuit 321 converts a DC current supplied from a power supply wire 296 into a 3-phase current for driving the motor 311, by using switching devices that number six or a multiple of six.

The motor 311 has a motor rotation sensor 314, which can detect a rotary angle of the motor rotor 313. The motor rotation sensor 314 may be a resolver, a magnetic or optical encoder or a Hall device. If the motor rotation sensor 314 is a resolver, the control unit 322 may have an R/D conversion circuit as a rotation sensor I/F (interface) to convert an electric signal generated by magnetism changes in a resolver device into a digital signal.

A temperature detection unit 316 detects a temperature of the calipers output unit 292 or motor 311. The temperature detection unit 316 may be a thermocouple or a thermistor. A thrust detection unit 317 detects a thrust generated by the piston 302. The thrust detection unit 317 may be a sensor using, for example, a strain gauge to calculate the thrust by comparing a measured strain with that of a member whose modulus of elasticity is known.

Figure 8:
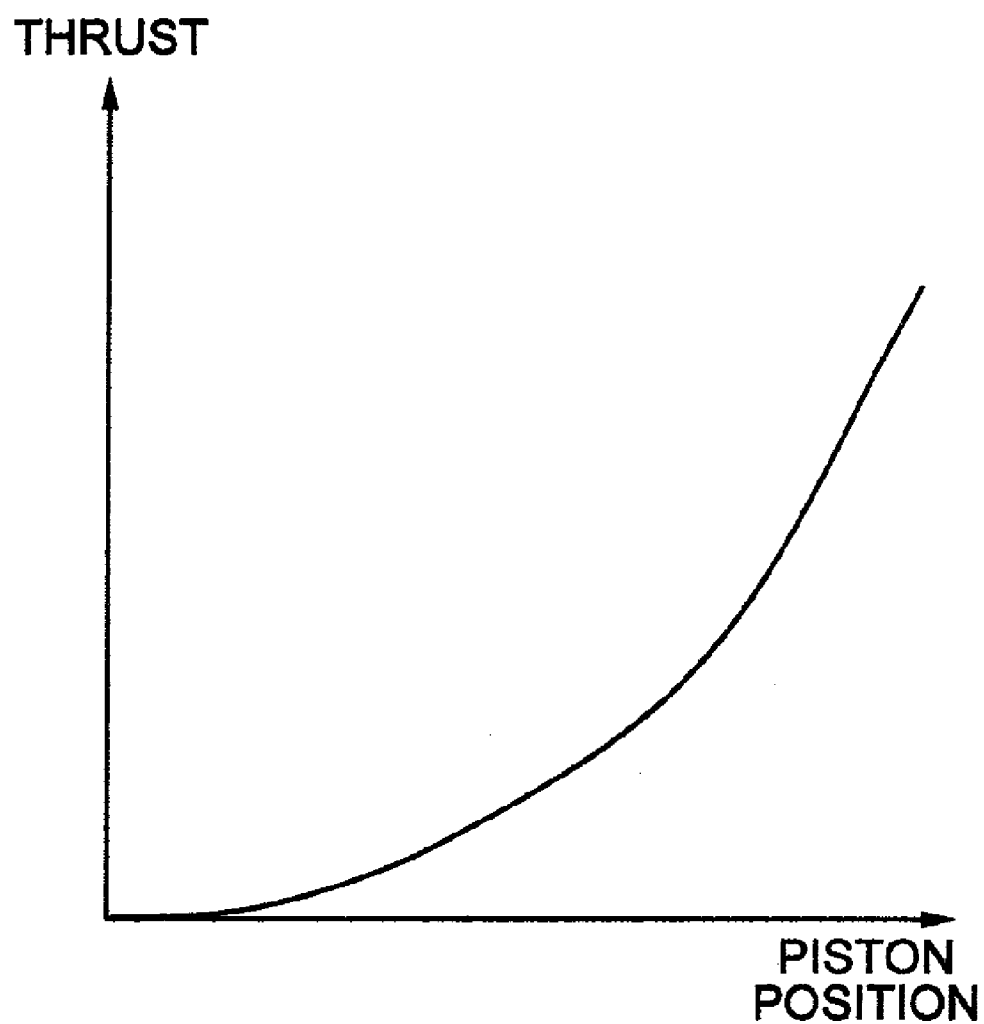
FIG. 8 shows an example relation between a thrust and a piston position in the motor-driven calipers device.

The controller 291, based on information received from a communication path 295, controls the motor to generate a thrust in the piston 302. The information transmitted from the communication path 295 may be a piston thrust or a vehicle deceleration. A unit for the information may be a physical unit representing a brake liquid pressure of a conventional hydraulic brake. In the case of a pedal device, the information may include a pedal position, pedal speed or a stepping force. The information received from the communication path 295 is converted by the control unit 322 into a piston speed, piston position and thrust or into a target status quantity for the motor-driven calipers device. The thrust generated by the motor-driven calipers device increases as the piston position moves in a direction that presses the pads against the rotor. FIG. 8 shows an example relation between the thrust of the motor-driven calipers device and the piston position.

The controller 291 controls a current flowing through the motor to cause the motor to produce a torque required to generate a thrust in the motor-driven calipers device. Here, a q-axis current of the motor controlled by the controller 291 is given by the following Equation 4.

q-axis current=K2×(target thrust+mechanism resistive force)+current used for acceleration and deceleration  (Equation 4)

Here, K2 is a proportional constant determined by a motor torque constant and a reduction ratio of the motor-driven calipers device. The mechanism resistive force depends on a friction of sliding portions of the motor-driven calipers device and an efficiency of the reduction gear and includes a reaction force produced by deformations of the motor-driven calipers device and, when a spring-element mechanism is used in the motor-driven calipers device, also includes its reaction force.

Figure 9:
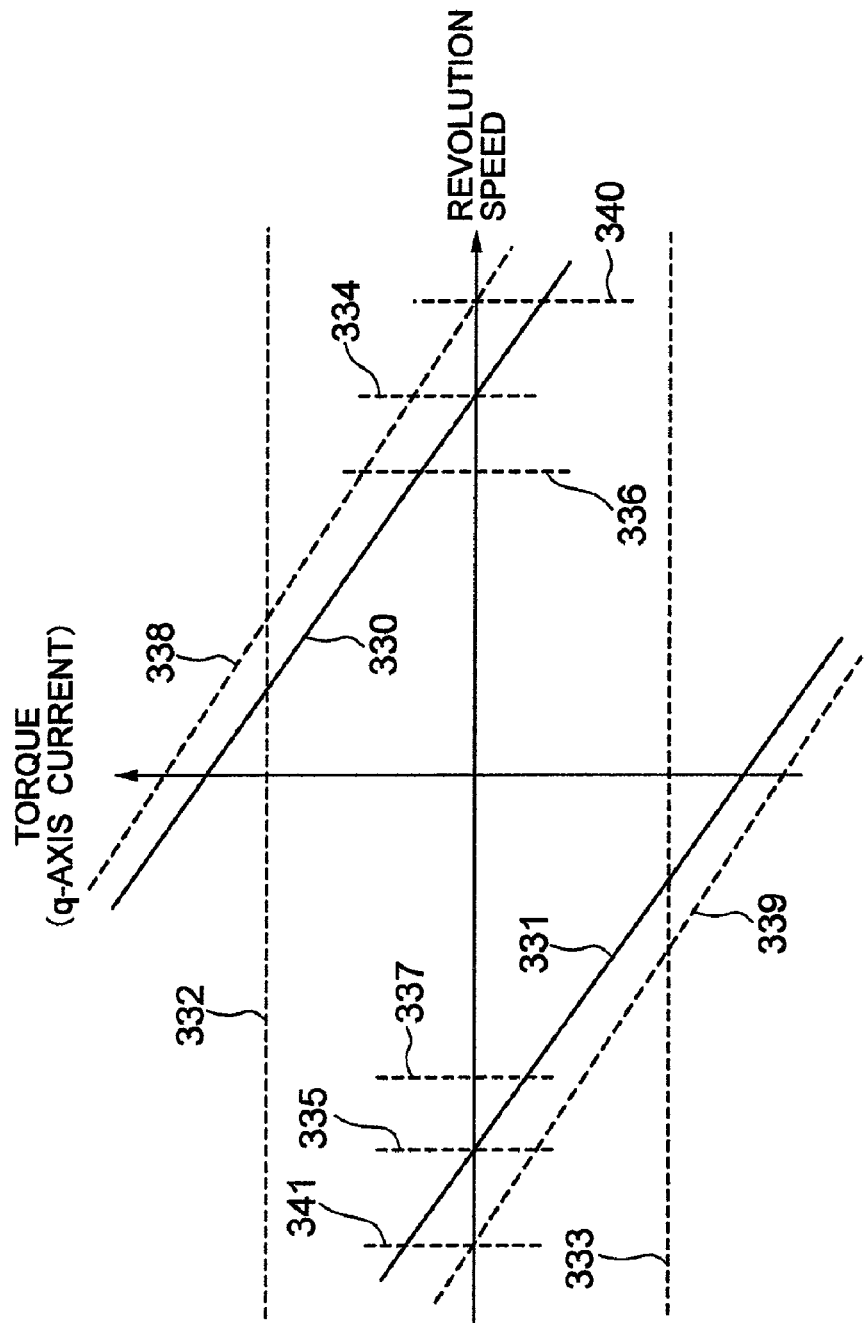
FIG. 9 shows an example characteristic of a range of torque or q-axis current that changes according to the revolution speed of the motor.

A range of torque of the motor or q-axis current that can be supplied to the motor changes according to the revolution speed of the motor. FIG. 9 shows an example characteristic of the torque or q-axis current that changes according to the revolution speed of the motor. Line 330 in FIG. 9 represents a maximum value of the torque that the motor can produce or of the q-axis current that can be supplied to the motor. Line 331 represents a minimum value of the torque or q-axis current.

Line 334 and 335 represent no-load revolution speeds. The no-load revolution speed refers to a highest possible revolution speed at which the motor can rotate when the motor is not loaded at all, i.e., when there are no external forces and no torque losses such as frictions. Generally the motor has some loads and torque losses such as frictions, so that the maximum revolution speed of the motor is somewhat slower than the no-load revolution speed, as indicated by 336 or 337.

The 3-phase current of the motor is three AC currents that have three different phases in terms of the rotation angle of the motor. That is, the three AC currents are 120 degrees apart in electric angle of the motor or in terms of rotation angle for each pair of magnetic poles of the motor. The 3-phase current supplied to the motor may be a sinusoidal wave. Let three phases be U phase, V phase and W phase and currents flowing to these phases be Iu, Iv and Iw. It is also assumed that the electric angle of the motor, or angle or phase of one set of poles of the motor, is θ. Then d-axis current Id and q-axis current Iq are defined as follows by Equation 5 and Equation 6.

$Id = Ad \times (Iu \times \cos\theta + Iv \times \cos(\theta - 2\pi/3) + Iw \times \cos(\theta + 2\pi/3))$  (Equation 5)

$Iq = Aq \times (-Iu \times \sin\theta - Iv \times \sin(\theta - 2\pi/3) - Iw \times \sin(\theta + 2\pi/3))$  (Equation 6)

Here, Ad and Aq are proportional constants, which are normally $\sqrt{(2/3)}$. The q-axis current obtained in Equation 6 is proportional to the motor torque. Therefore, for the control of the motor torque the control unit controls the q-axis current by controlling the 3-phase current.

The d-axis current determined by Equation 5 has no correlation with the motor torque. When the d-axis current flows on a positive side, the motor torque constant or induced voltage constant appears large. When the d-axis current flows on a negative side, the motor torque constant or induced voltage constant appears small. Therefore, when the d-axis current flows on the negative side, the no-load revolution speed of the motor decreases; and when it flows on the negative side, the no-load revolution speed increases. For example, the d-axis current flowing on the negative side causes the line 330 of FIG. 9 to change to line 338 and line 331 to change to line 339. As a result, the no-load revolution speed increases from point 334 to point 340 and from point 335 to point 341.

Figure 10:
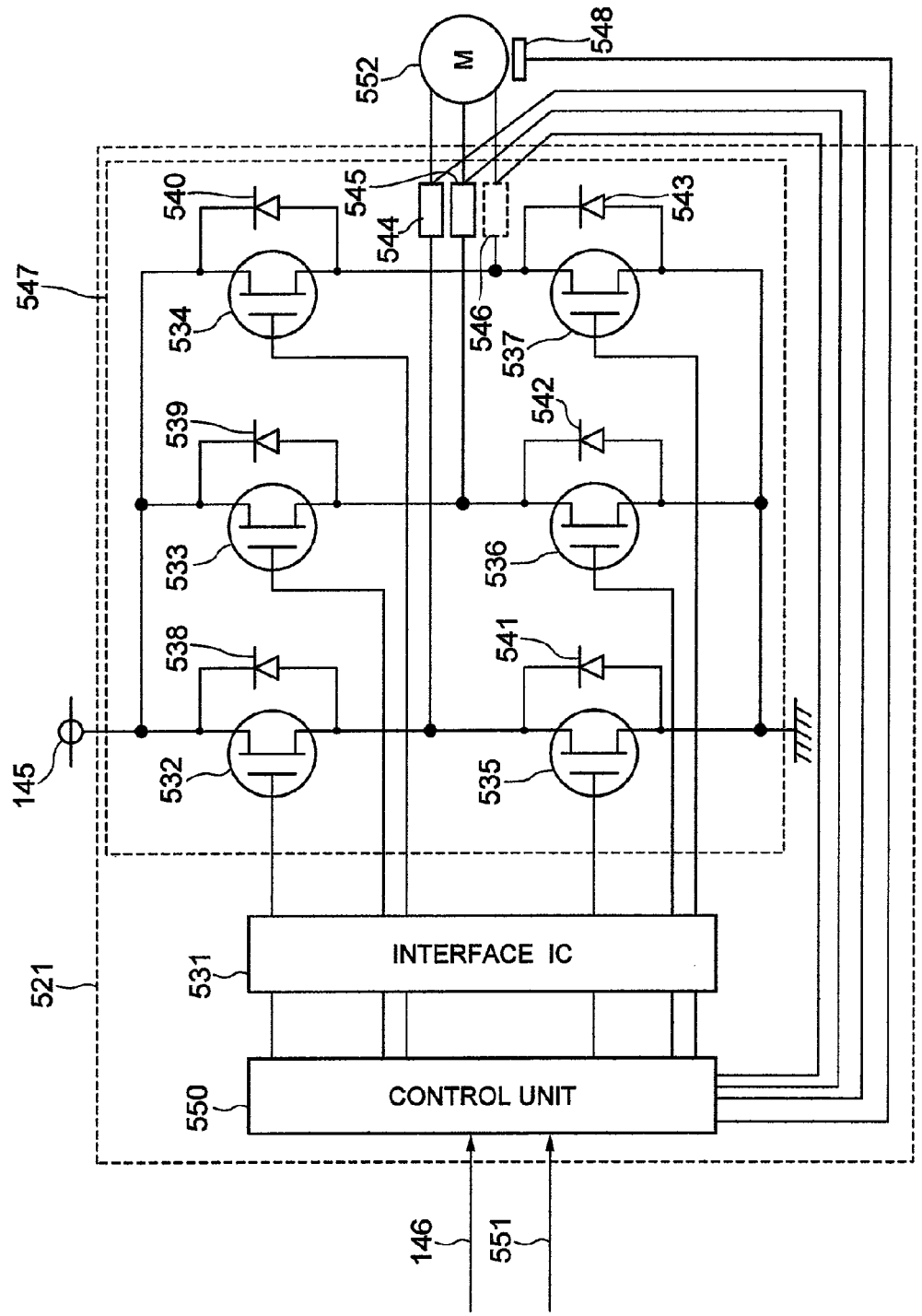
FIG. 10 shows an example control device installed in the on-vehicle actuator system according to this invention.

FIG. 10 shows an example of the controller used in the on-vehicle actuator system of this invention. A controller 521 has a control unit 550 and an inverter circuit 547. The inverter circuit 547 has at least six switching devices 532-537, each having flywheel diodes 538-543. The switching devices and the flywheel diodes may be duplicated. When the switching devices are multiplicated, the number of switching devices in the inverter circuit is a multiple of six. The inverter circuit receives electricity from the vehicle power supply system 145 to generate a 3-phase current to drive a motor 552.

The switching devices may be power transistors, MOSFETs or IGBTs. Generally, if the motor rated capacity is less than a few hundred watts, MOSFETs are used; and if it is greater than a few kilowatts, IGBTs are used. The inverter circuit 547 has current sensors 544-546 to detect a current flowing in the motor 552. The current sensor 546 may be not provided. The current sensors may be implemented by a Hall element, a current transformer or a shunt resistor.

The control unit 550 detects a motor rotation angle and revolution speed by a revolution sensor 548. The control unit 550 receives necessary information via the vehicle communication system 146. Further, the control unit 550 has an information detection unit 551 which may detect a stepping force or a thrust. The control unit 550, based on a current value detected by the current sensor and information detected by the information detection unit, controls a current flowing in the motor. An interface IC 531 transforms an electric signal output from the control unit 550 into a signal for driving the switching devices. The control unit 550 outputs a pulse width modulated signal to drive the switching devices. A voltage applied to the motor 552 is determined by a voltage of the vehicle power supply system 145 and a duty ratio of a pulse signal output from the control unit 550.

In the embodiment of FIG. 10, when one of upper arm devices (532, 533, 534) turns on and one of lower arm devices (535, 536, 537) turns on, a current from the vehicle power supply system 145 flows through the ON-device of the upper arm devices into the motor 552, from which it further flows through the ON-device of the lower arm devices into ground GND. Thus, the control unit 550 can generate a necessary torque in the motor by controlling the ON (drive) timing of the upper arm devices and the lower arm devices to control the current flowing through the motor. Here, the control unit 550 may also control the 3-phase current, for example, by a vector control using an electric angle of the motor detected by the revolution sensor 548 and three phase currents detected by the current sensors 544-546.

Figure 11:
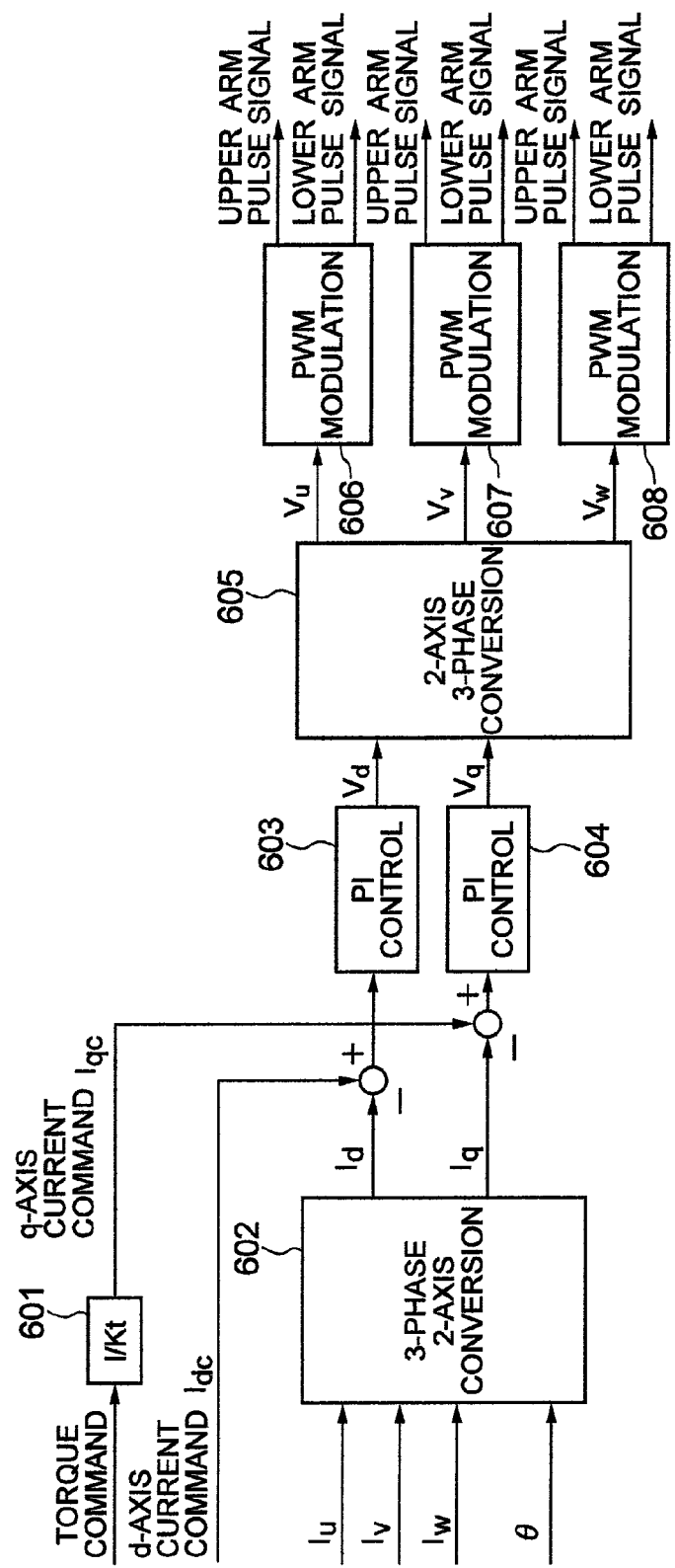
FIG. 11 is a block diagram showing an example control unit 550 of FIG. 10.

FIG. 11 is a block diagram showing an example of the control unit 550. In FIG. 11, a 3-phase/2-axis conversion 602 calculates a d-axis current and a q-axis current from Equation 5 and 6. Denoted 601 is a unit to convert a target torque command to be generated by the motor into a q-axis current command Iqc. Since the q-axis current and the torque are in a proportional relationship, Kt is a proportional constant. A PI control 603 performs a PI control of the following Equation 7 on a difference between the d-axis current command Idc and the d-axis current Id to calculate a d-axis voltage Vd.

$$Vd=Kp \times (Idc-Id)+Ki \times \int (Idc-Id)dt \quad \text{(Equation 7)}$$

A PI control 604 performs a PI control of the following Equation 8 on a difference between the q-axis current command and the q-axis current to calculate a q-axis voltage Vq.

$$Vq=Kp \times (Iqc-Iq)+Ki \times \int (Iqc-Iq)dt \quad \text{(Equation 8)}$$

Here Kp and Ki are control gains. Kp and Ki may use different values between Equation 7 and Equation 8.

A 2-axis/3-phase conversion 605 calculates voltages Vu, Vv, Vw for three phases from the d-axis voltage Vd and the q-axis voltage Vq by the following Equation 9, 10 and 11.

$$Vu=Au \times (Vd \times \cos\theta - Vq \times \sin\theta) \quad \text{(Equation 9)}$$

$$Vv=Av \times (Vd \times \cos(\theta-2\pi/3) - Vq \times \sin(\theta-2\pi/3)) \quad \text{(Equation 10)}$$

$$Vw=Aw \times (Vd \times \cos(\theta+2\pi/3) - Vq \times \sin(\theta+2\pi/3)) \quad \text{(Equation 11)}$$

Here Au, Av and Aw are normally a proportional constants of $\sqrt{(2/3)}$. PWN modulations 606, 607, 608 convert voltages of the three phases into upper or lower arm pulse signals by a pulse width modulation.

The control method shown in FIG. 11 thus can control the d-axis current and the q-axis current as instructed and also control the currents Iu, Iv, Iw of three phases as a 3-phase current for driving the motor.

Explanations have been given as to the method of generating a torque in a motor. There are cases where the motor may be rotated by external forces. For example, the motor of the on-board actuator system may be applied human external forces, such as stepping forces and steering forces. Further, where the on-board actuator system has a plurality of motors, one of the motors is subjected to a force or torque from other motors as external forces. Furthermore, if the on-board actuator system has elastic members and a hydraulic mechanism, the motors are subjected to external forces from the mechanism. For example, in the operation input device the motors may be rotated by external forces from the passive reactionary force mechanism. Also, in the vehicle output device a pad reactionary force may work as an external force pushing back a piston, resulting in the motors being turned by the external force.

Motors, when rotated by external forces, generate or regenerate electricity. Also, when it generates a torque that decelerates the revolution speed, the motor may generate an electricity. The electricity produced by generation or regeneration increases with the revolution speed and also with the torque the motor has produced.

The regeneration occurs in a second and fourth quadrant in FIG. 9. Thus, when the motor is rotating in a direction opposite that of the torque or current, the regeneration occurs. However, since the motor and the inverter circuit have losses, the regeneration may not occur even in the second or fourth quadrant of FIG. 9 when the revolution speed, torque or current is small. Here losses of the motor and the inverter circuit include those produced by resistance, switching or diodes.

According to general terms, a "generation" means creating an electricity by a motor when it is rotated at a speed higher than a no-load revolution speed, and a "regeneration" means creating an electricity by a motor when it is rotated at a speed lower than the no-load revolution speed. In this invention the "generation" by a motor includes the "regeneration" and whenever a motor creates an electricity, it is referred to as a "generation", unless otherwise specifically noted.

In FIG. 10 when a motor generates, it becomes a power supply source and supplies electricity to the vehicle power supply system 145. If, when the motor supplies power to the vehicle power supply system, the power storage unit has an additional capacity to store electricity generated by the motor, the vehicle power supply system can receive power from the motor. However, when the vehicle is running, the power storage unit is supplied electricity at all times from the generating unit and thus may not always be able to store electricity. When the storage unit has no additional capacity to store electricity, a situation can occur in which there are no places where the generated current can flow.

Further, although electricity from other power supply systems can be stepped up or down and supplied to the inverter circuit, there can occur a situation where there are no places the generated current can flow to even when the power supply system cannot feed the electricity from the inverter circuit to other power supply systems.

For example, if a storage unit is not directly connected to the vehicle power supply system and if a transformer unit such as a DC-DC converter is designed to transform the electricity from the storage unit into an electricity for the vehicle power supply system but cannot supply electricity from the vehicle power supply system to the storage unit, then there can be nowhere for the generated current to flow to.

Further, in a vehicle with a generating unit or a storage unit of a few hundred volt, as in a hybrid car, if the on-board actuator is operated at a lower voltage, the vehicle power supply system connected to the inverter circuit constitutes a power source system whose voltage is stepped down by a transformer unit from the power of the generating unit and the storage unit. So, if power cannot be supplied from the vehicle power supply system connected to the inverter circuit to the storage unit, there may not be a place for the generated current to flow to.

Further, if the on-board actuator is operated at a higher voltage than the generating unit and the storage unit of the vehicle, the vehicle power supply system connected to the inverter circuit constitutes a power source system whose voltage is stepped up by a transformer unit from the power of the generating unit and the storage unit. So, if power cannot be fed from the vehicle power supply system connected to the inverter circuit to the storage unit, there may not be a place for the generated current to flow to.

Further, there is a semiconductor between the vehicle power supply system and the inverter circuit. If power cannot be supplied from the inverter circuit to the vehicle power supply system although it can be supplied from the vehicle power supply system to the inverter circuit, there may also not be a place for the generated current to flow to.

For example, the inverter circuit may be provided with a capacitor. If the inverter circuit has a capacitor and the vehicle power supply system should be ground-faulted, a large current flows out of the capacitor of the inverter circuit, which may burn a current path. Thus, if the inverter circuit has a capacitor, a diode may be inserted between the vehicle power supply system and the inverter circuit to block current from flowing from the inverter circuit to the vehicle power supply system.

In the examples above, since enough current does not flow to the vehicle power supply system even when a motor generates, the motor of the on-board actuator system cannot generate power normally, whatever condition the on-board actuator system is in. Since power is a product of voltage and current, the voltage of the vehicle power supply system, the motor or the inverter circuit may go abnormally high, adversely affecting or faulting the controller, the motor or other controllers and electric devices connected to the vehicle power supply system.

If enough current does not flow to the vehicle power supply system even when the motor generates, the amount of electricity generated is limited. The amount of generation increases with a product of the motor torque or current and the revolution speed. When the motor is rotated by an external force, its revolution speed depends on the external force. So, if the amount of generation is limited, the motor torque or current is also limited, making it likely that the on-board actuator cannot control the required torque or current.

Where the direction of torque or current is reverse to the direction of rotation, if the motor is rotated at a higher speed than the no-load revolution speed, it may not be possible to generate a small torque or apply a small current of a magnitude between line 330 and line 331, rendering the control by the on-board actuator of the necessary torque or current impossible.

Thus, the control unit may control the motor or the inverter circuit in such a way that the motor is supplied electricity at all times from the vehicle power supply system or at least does not supply electricity to the vehicle power supply system. That is, the control unit may perform control on the motor or the inverter circuit such that the motor does not generate or regenerate power at all. Further, it is also possible to calculate an electric power of the motor and perform control so that the motor always consumes power or at least its power consumption will not become negative.

The control by the control unit not to supply electricity to the vehicle power supply system or at least not to generate power may be performed when the motor is rotating in a direction opposite the direction of torque or force being generated by the motor or when the motor is rotated by an external force in the same direction as the external force to generate a torque or force resisting the external force, or when the motor is rotating in such a direction that a torque or force being generated acts to reduce the revolution speed of the motor.

Figure 12:
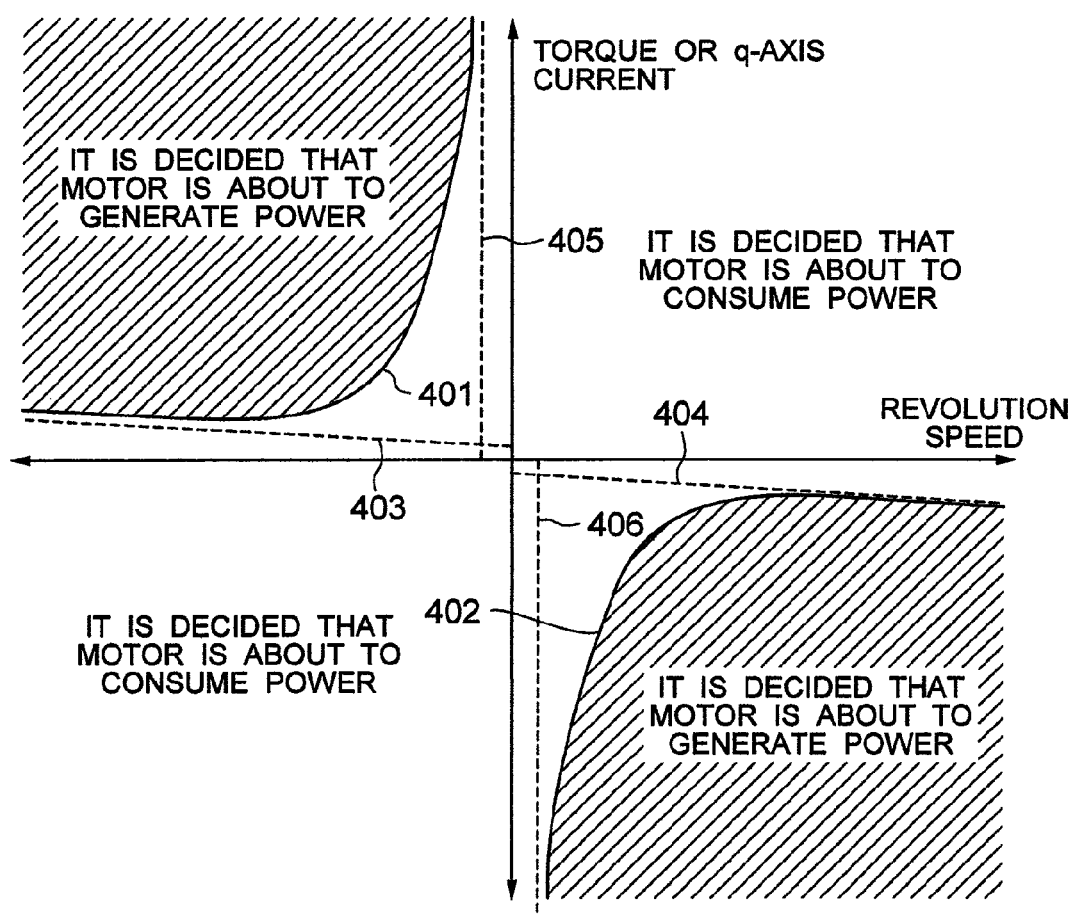
FIG. 12 shows an example table used by the control unit in deciding whether or not to execute the control of this invention.

FIG. 12 shows an example of table used by the control unit in deciding whether or not to perform a control of not supplying electricity to the vehicle power supply system or of preventing generation of power. In this table, a motor torque or q-axis current flowing in the motor is represented by an ordinate and a motor revolution speed by an abscissa.

In FIG. 12, when the relation between the torque or q-axis current and the revolution speed falls in a shaded area above a threshold 401 or below a threshold 402, the control unit decides that the motor is about to generate power and thus performs control to prevent the power generation.

The threshold 401 and 402 assume infinite and negative infinite torques or q-axis currents at revolution speeds 405 and 406. At revolution speeds slower than the revolution speeds 405 and 406, the generated power becomes electric losses in the control device or inverter circuit. More specifically, these losses include drops and switching losses of diodes and switching devices and those caused by control limitations, such as a dead time inserted to prevent the upper and lower arm devices from short-circuiting to bypass the motor. Further, since the revolution speed is also changed by a reduction ratio of the reduction gear, the thresholds need to be designed by taking an optimization of the entire equipment into account. Dotted lines 403 and 404 correspond to "mechanism resistive force" in Equation 2, 3 and 4 and define upper and lower limits of the threshold 401 and 402.

To prepare the table of FIG. 12 requires precise acquisition of parameters of the motor and the inverter circuit. However, the d-axis current has no correlation with the torque, so that if additional power consumption is allowed, the d-axis current can flow in a region below line 401 or above line 402 of FIG. 12 without causing any problem. Therefore, if a product of the torque and the revolution speed or of the q-axis current and the revolution speed is negative and is greater in a negative direction than a predetermined product threshold, then the control unit may perform a control of not supplying power to the vehicle power supply system or not generating power.

If the on-vehicle actuator system is a pedal device, the torque produced by the motor acts as a pedal reaction and the motor revolution speed is equivalent to a pedal speed. Thus, as to whether or not the control unit should execute the control of not supplying electricity to the vehicle power supply system or of not generating power, a decision may be made based on the pedal reactionary force and the pedal speed. That is, if the product of the pedal reactionary force and the pedal speed is negative and is greater in the negative direction than the predetermined threshold, the control unit may execute a control of not supplying power to the vehicle power supply system or not generating power.

To ensure that the motor receives power at all times from the vehicle power supply system, is always prevented from generating or regenerating power and consumes power at all times, the control unit controls the motor or the inverter circuit to supply the d-axis current to the motor so that the motor consumes power, does not generate power nor supply electricity to the vehicle power supply system. Since the d-axis current has no correlation with the torque, applying the d-axis current to the motor can make it consume power and prevent it from generating and supplying power to the vehicle power supply system without affecting the control of motor torque and q-axis current, thereby avoiding adversely affecting the function and operation of the on-board actuator system.

Here, the current that the control unit supplies to the d axis in order to offset the amount of power generated may be calculated from Equation 12 shown below.

$$Id = \pm \sqrt{(Iq \times Iq + T \times \omega/R + Welse/R)} \quad \text{(Equation 12)}$$

R is a phase resistance of the motor which is a resistance of the motor winding including, in some cases, harness resistances of switching devices in the inverter circuit and between the inverter circuit and the motor. T is a motor output torque, and ω is a motor revolution speed. Welse is other power which includes inverter switching losses, heat losses of resistances between the vehicle power supply system and the inverter, and iron losses of the motor.

The d-axis current may be either positive or negative as long as it can be consumed, but it is generally set as negative. When the motor is rotated at a speed higher than the no-load revolution speed in a direction opposite the torque, it is no longer possible to produce a small torque or apply a small q-axis current. However, applying a negative d-axis current can increase the no-load revolution speed. So, it is preferred that the d-axis current be supplied in a negative sign to enable control on the torque or q-axis current.

The parameters in Equation 12 are influenced by many variations and temperature changes and thus difficult to determine precisely. Since division and multiplication operations and square root operation are included, there is a great calculation burden. To deal with this problem, the control unit may prepare a two-dimensional table with the torque or q-axis current represented in one axis and the revolution speed in another, and determine Id from this table. When Equation 12 is used, the control unit may adopt a control which sets the d-axis current—that is used to prevent the motor from generating power—a predetermined value higher than that determined by Equation 12, thus preventing the motor generation without being affected by parameter variations or temperature changes. When the d-axis current is set higher than the current determined by Equation 12, the motor consumes power supplied from the vehicle power supply system. Therefore, applying too much of the d-axis current will result in an energy being wasted or in increased heat losses. How much higher than the current value of Equation 12 the d-axis current should be set depends on parameter variation ranges and on how much additional d-axis current is allowed to be supplied. So it varies from one system to another.

Figure 13:
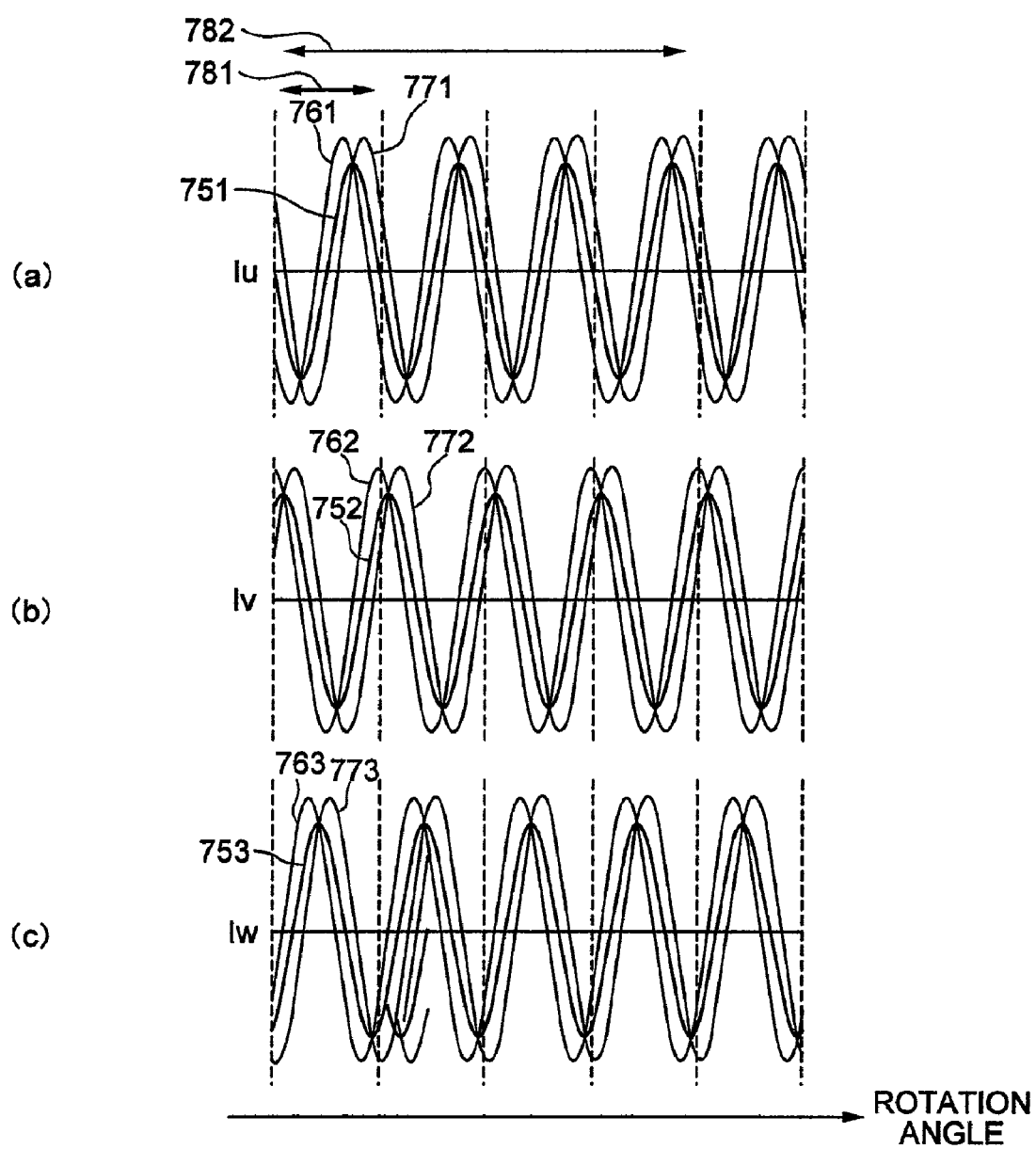
FIG. 13 is a current waveform diagram showing an example operation of the on-vehicle actuator system of this invention.

FIG. 13 is a current waveform diagram for an example operation of the on-vehicle actuator system of this invention. In FIG. 13, Iu, Iv, Iw represent a 3-phase current flowing in the motor. Here, the motor is assumed to have four pairs of S and N magnetic poles. If line 782 represents one rotation (360 degrees) of an output shaft, line 781 corresponds to an electric angle of 360 degrees. If the 3-phase current is sinusoidal in terms of rotation angle for each pair of magnetic poles of the motor, when the d-axis current is not flowing, the 3-phase currents are as shown by 751, 752, 753. Here, if the d-axis current is increased in a positive direction, the 3-phase currents lag, as shown by 761, 762, 763. If the d-axis current is increased in a negative direction, the 3-phase currents lead, as shown by 771, 772, 773. If the d-axis current is set positive, the 3-phase currents lag by up to −90 degrees in electric angle from when the d-axis current is set to 0. If the d-axis current is set negative, the 3-phase currents lead by up to +90 degrees in electric angle from when the d-axis current is set to 0.

The effective value of the 3-phase current is defined to be $1/\sqrt{2}$ of an amplitude of the 3-phase current. Generally the power consumed by a motor is proportional to an effective value of the 3-phase current squared. A current that produces a torque is a q-axis current, whose magnitude is represented by an amplitude of the 3-phase current. That is, when the d-axis current is 0, the current that produces a torque is proportional to an effective value of the 3-phase current. When the d-axis current is applied to the motor, the effective value of the 3-phase current increases, as shown in FIG. 13.

Figure 14:
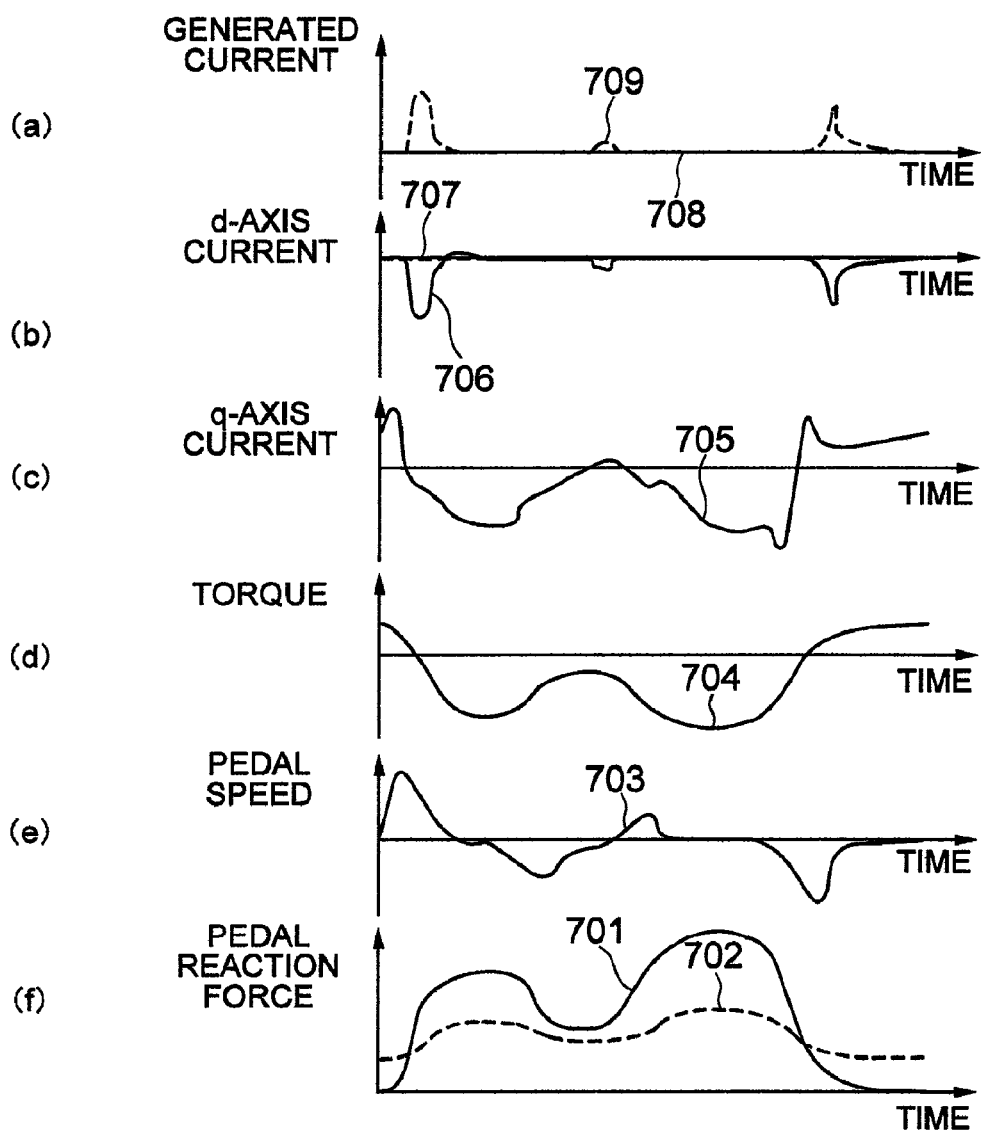
FIG. 14 shows an example operation with an abscissa taken as a time axis when the on-vehicle actuator system is a pedal device.

Thus, in order to ensure that the motor is always supplied power from the vehicle power supply system and that the motor is always prevented from generating or regenerating power and therefore always consumes power, the control unit may increase the effective value of the 3-phase current to increase the power that the motor consumes and may advance or delay the phase of the 3-phase current to reduce a percentage of the torque with respect to the effective value of the 3-phase current, thus preventing the motor generation while controlling to generate a target torque.

Where the on-board actuator system is a pedal device, a torque produced by the motor acts as a pedal reaction and a revolution speed of the motor is equivalent to a pedal speed. FIG. 14 shows an example case where a motor generates power. FIG. 14 shows a pedal reactionary force, pedal speed, torque, q-axis current, d-axis current, generated current or current supplied to the vehicle power supply system, with an abscissa taken as a time axis. Solid line 701 in FIG. 14 shows changes in pedal reactionary force. Broken line 702 indicates a passive reactionary force or a reactionary force or friction force of mechanism in the pedal device. The pedal reactionary force changes with the pedal position, so the pedal speed changes similarly to an inclination of the pedal reactionary force. That is, where the inclination of the pedal reactionary force is large is where the pedal speed is large. If the inclination of the pedal reactionary force is positive, the pedal speed is also positive. Likewise, if the inclination of the pedal reactionary force is negative, the pedal speed is also negative.

FIG. 14 shows a pedal speed at 703. A motor torque that the pedal device transmits to the outside is a difference between the pedal reactionary force and the passive reactionary force or a difference between the pedal reactionary force and the reactionary force or frictional force of mechanism in the pedal device. Since a reactionary force needs to be generated against an external force applied to the pedal, a torque must be produced that increases in a negative direction as the pedal reactionary force increases in a positive direction. In FIG. 14 the torque is represented by 704. The q-axis current is a sum of a component proportional to the torque and a component proportional to an acceleration/deceleration of the motor. Thus, when an inclination of the pedal speed is large, the q-axis current is large. In FIG. 14 the q-axis current is represented by 705.

Here, if the d-axis current when the control of this invention is not executed is represented by broken line 707, a generated current of the motor or a current supplied to the vehicle power supply system is represented by broken line 709. If the pedal reactionary force 701 is greater than 702 and is increasing, the motor-generated current (or supply current to the vehicle power supply system) occurs. The motor-generated current (or supply current to the vehicle power supply system) also occurs when the pedal reactionary force 701 is smaller than 702 and is decreasing and the pedal speed is small. It is also produced when the pedal speed is decreasing.

According to the control of this invention, the d-axis current is applied as shown by solid line 706, which in turn causes the motor to generate current (or to supply current to the vehicle power supply system) as shown by solid line 708. That is, the control of this invention, when executed, can control the pedal reactionary force without the motor generating a current (or supplying current to the vehicle power supply system).

Figure 15:
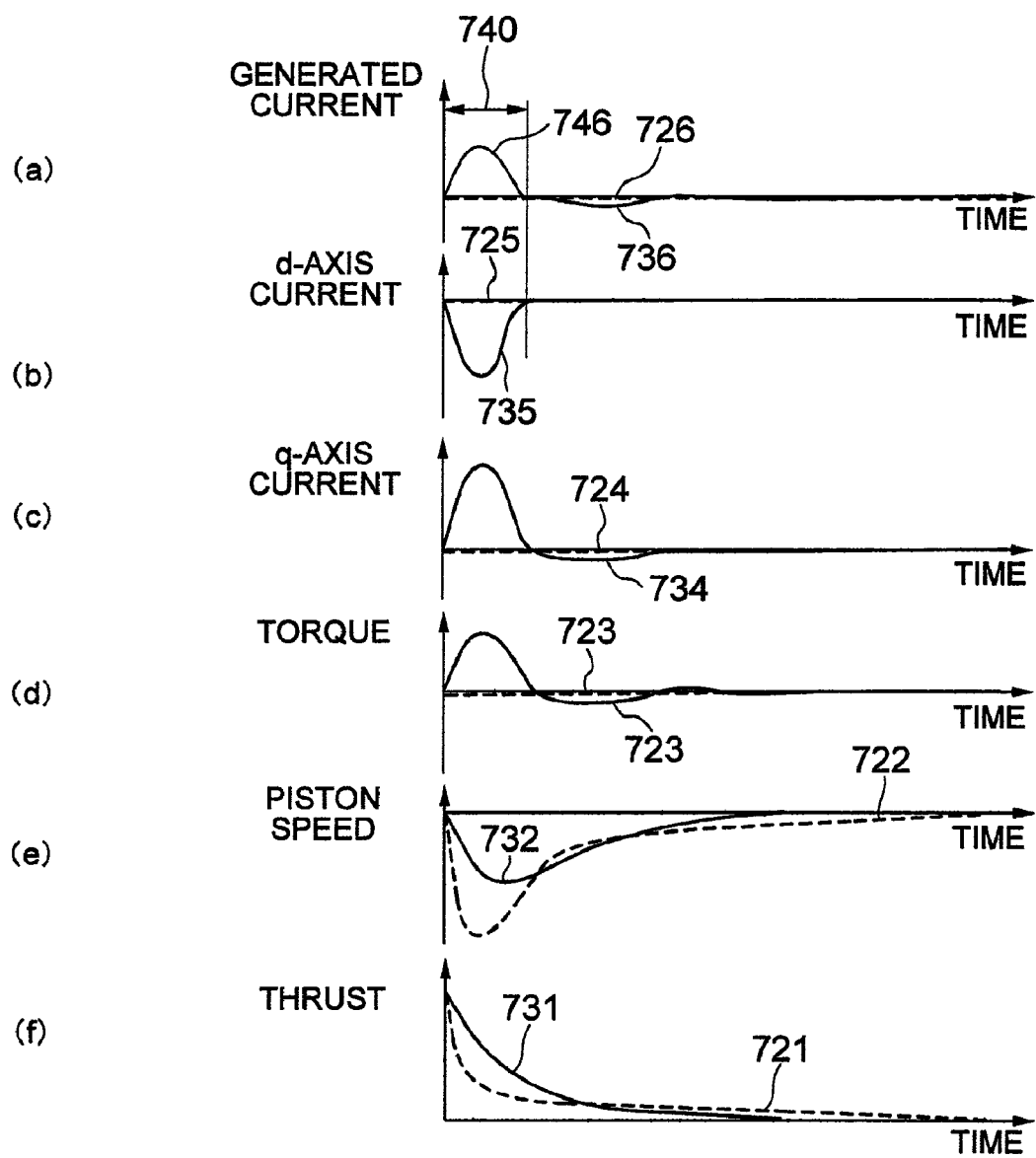
FIG. 15 shows an example operation with an abscissa taken as a time axis when the on-vehicle actuator system is a motor-driven calipers device.

When the on-board actuator system is an electric calipers device, the torque produced by the motor acts as a thrust and the revolution speed of the motor is equivalent to the piston speed. In the case of the electric calipers device, the operation of FIG. 15 results in a power generation. FIG. 15 shows an example relation among thrust, piston speed, torque, q-axis current, d-axis current and generated current (or supply current to the vehicle power supply system) with an abscissa taken as a time axis when the thrust is progressively decreased.

In FIG. 15, broken lines for thrust 721, piston speed 722, torque 723, q-axis current 724, d-axis current 725 and generated current 726 represent a case where the control unit does not control the motor and no current flows to the motor.

When the actuator is controlled to produce a thrust as shown by broken line 721, if the control unit of this invention is not operated, the piston of the electric calipers device is pushed back by the pad reactionary force and the thrust rapidly decreases. Since the d-axis current is 0 here, the generated current (supply current to the power supply system) is as shown by 746, giving rise to a problem that the motor generates power or supplies it to the vehicle power supply system.

When on the other hand the control unit of this invention is operated to control the motor to reduce the output of the actuator system as shown by line 731, the piston speed 732, torque 733 and q-axis current 734 behave as shown by solid lines, offsetting the generated current by the generation of the q-axis current, with the result that the generated current (power supply current) is as shown at 736.

In FIG. 15, the thrust 731 produced when the control unit performs the control decreases more moderately than the thrust 721 produced when the control unit is not activated. So, the direction of rotation of the motor is reverse to that of the motor torque.

In a segment 740, if it is decided that the motor is about to generate, the actuator system of this invention applies the d-axis current as shown at 735 and the generated current is as shown at 736. That is, the motor does not generate power; nor does it supply power to the vehicle power supply system.

As described above, this invention prevents the motor from generating power even when the motor is rotated in a direction opposite that of the torque or at a speed higher than the no-load revolution speed. This makes it possible to realize an on-vehicle actuator system independent of the vehicle power supply system.

Embodiment 2

Figure 16:
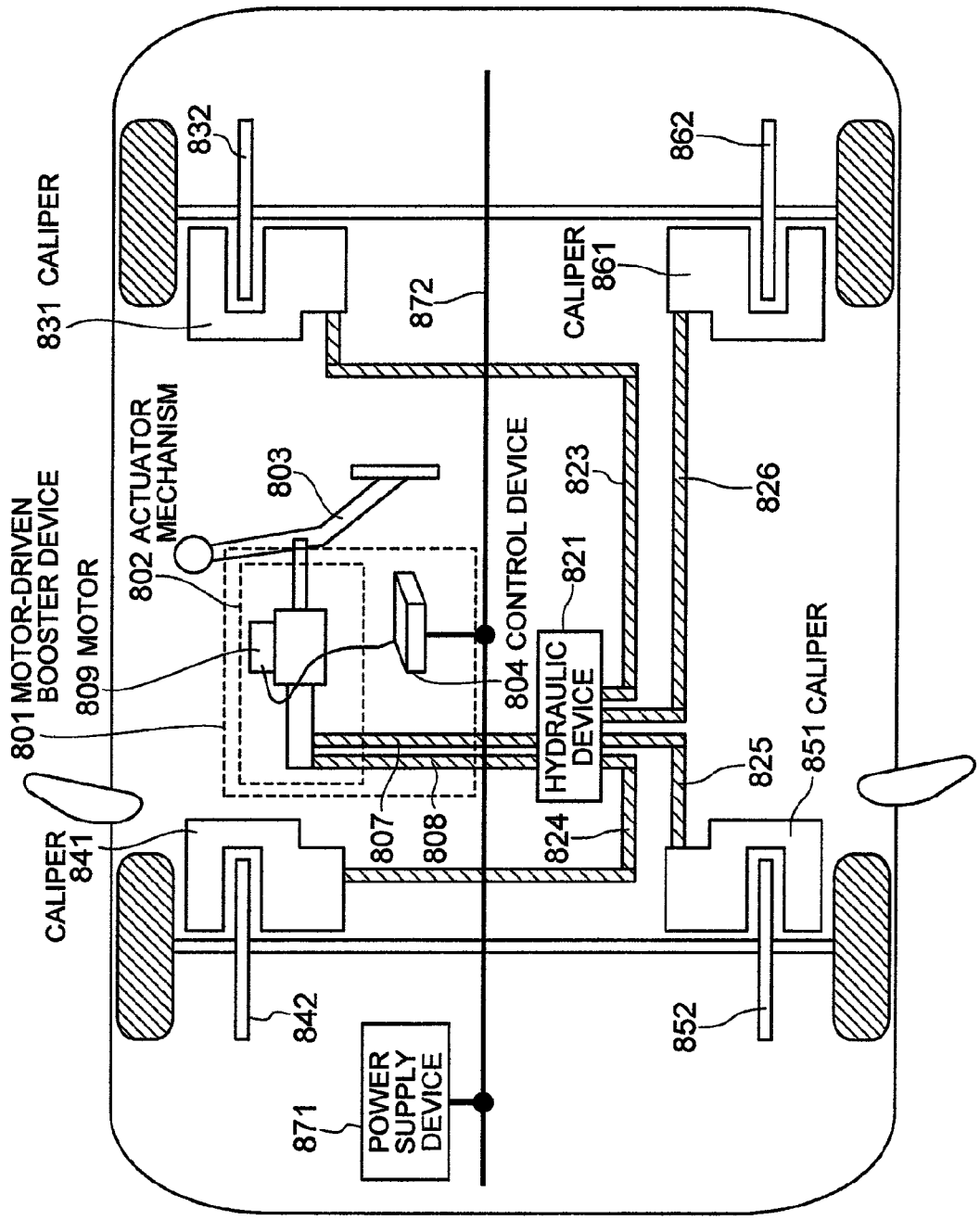
FIG. 16 is a schematic diagram of a system as embodiment 2 of this invention.

FIG. 16 is a schematic diagram of a system according to embodiment 2. Denoted 801 is a motor-driven booster device and 802 a brake output device or an actuator mechanism having an input mechanism that the driver operates to drive a vehicle. The brake output device 802 has both functions of the brake output device and the operation input device. Designated 803 is an input mechanism operated by the driver when he or she drives the vehicle. This is a pedal in embodiment 2 but, depending on the system configuration, may employ a handle or lever. Denoted 831, 841, 851, 861 are calipers to generate a braking force in the vehicle. The motor-driven booster device 801 generates an operation reactionary force in the input mechanism 803 and also a hydraulic pressure in piping 807, 808. A hydraulic device 821 distributes a hydraulic pressure of piping 807, 808 to piping 823, 824, 825, 826. The hydraulic pressures in the piping 823, 824, 825, 826 act as piston thrusts for calipers 831, 841, 851, 861 to press frictional members against rotors 832, 842, 852, 862. The rotors are secured to wheels, so that when the frictional members are pressed against the rotors, braking forces are produced by frictions.

The actuator mechanism 802 of the motor-driven booster device 801 has a motor 809. The motor-driven booster device 801 has a control device 804 to control the motor 809. The motor 809 is supplied electricity from a power supply system 872. In embodiment 2 of FIG. 16, although the actuator mechanism 802 and the control device 804 are shown separated, they may be constructed as an integral device, depending on a system configuration.

The power supply system 872 is connected with a power supply unit 871 that supplies power to the motor-driven booster device 801. The power supply unit 871 may be a battery, alternator or generator. It may also be a DC-DC converter that converts various voltages to a required voltage for the motor-driven booster device 801. It may also be a combination of these.

Figure 17:
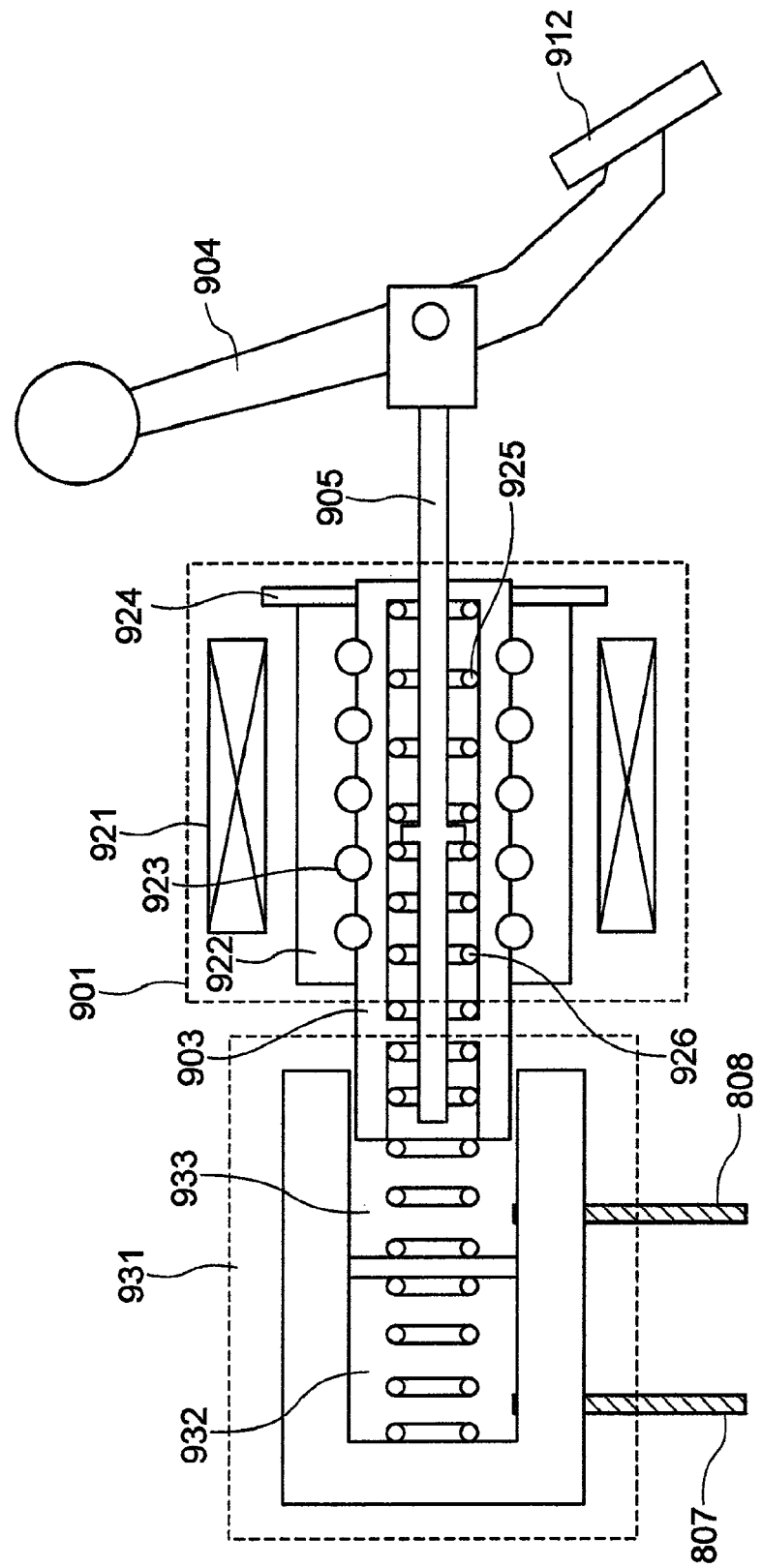
FIG. 17 shows an example motor-driven booster device of embodiment 2 of this invention.

FIG. 17 shows an example of the motor-driven booster device. Denoted 904 is a pedal. A driver steps on an pedal end 912 to cause the vehicle to move and at the same time feels a pedal reaction from that end 912. The pedal end 912 may be provided with a sensor for measuring a stepping force. An input rod 905 is pushed by the pedal 904 and may be provided with a sensor for measuring a rod force. Denoted 931 is a master cylinder which has its interior divided into a cylinder 932 and a cylinder 933, both filled with a brake liquid. When the input rod 905 and a primary piston 903 are pushed into the master cylinder 931, a hydraulic pressure increases in the cylinder 933 and in the cylinder 932 to activate the calipers through the piping 807 and 808 to generate a braking force. An armature 922 includes a magnetic member and thus is rotated by a magnetic field generated by a stator 921 to produce a torque. The rotation and torque of the armature 922 is transmitted through a ball screw 923 to the primary piston 903 and transformed into a linear motion or linear force of the primary piston. The rotation of the armature 922 is detected by a rotary sensor 924 and information detected by the rotary sensor 924 is used for a control of a current applied to the stator 921 or of a position and speed of the primary piston.

The actuator 901 including the stator 921 and the armature 922 shown in FIG. 17 works primarily as a brake output device to generate a brake output. The primary piston 903 and the input rod 905 are connected by a first offset spring 925 and a second offset spring 926. The primary piston and the input rod are also connected through a brake liquid in the master cylinder 931. The hydraulic pressure from the master cylinder is transmitted to the primary piston and the input rod as a force proportional to a cross-sectional area. Therefore, the force acting on the input rod 905 is directly transmitted to the master cylinder 931 and the force of the actuator 901 is added to the master cylinder, with the result that the stepping force of the driver and the actuator force are both applied to the calipers, generating a braking force in the vehicle. In the construction of embodiment 2, the brake output is a brake oil pressure generated by the master cylinder. By controlling the actuator 901 the brake output can be electrically controlled according to the operation position of the pedal end 912.

In embodiment 2 the operation input device and the brake output device are constructed as an integral device, so the control unit is a control device 804.

In the motor-driven booster device, the reactionary force of the hydraulic pressure from the master cylinder, the reactionary force of the offset springs and the human force of the driver are applied to the motor as external forces. So, the motor is rotated by the external forces as it controls the pedal reactionary force and the brake output. Further, the motor-driven booster device statically generates a force or torque based on an amount of operation of the input mechanism or a magnitude of the brake output and dynamically produces a force or torque based on an amount of change in the input mechanism or an amount of change in the brake output. At the same time the control unit controls the motor to produce a desired force or torque at an arbitrary revolution speed.

Therefore, when the motor generates power, the application of this invention can produce effects and advantages similar to those of embodiment 1.

In a brake system and an acceleration system of a variety of kinds of vehicles such as internal combustion engine, electric and hybrid automotives, this invention is applicable to a wide range of fields as a countermeasure to prevent a motor driven by a 3-phase current from generating or regenerating power when it is about to do so.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An on-vehicle actuator system comprising:
a motor that is driven by a 3-phase current, and is operable as an electric generator or a regenerative device;
an inverter circuit having switching devices to drive the motor;
a power supply system connected to the inverter circuit to supply electricity to the motor and the inverter circuit; and
a control unit to control a current or voltage applied to the motor by controlling an operation of the switching devices;
wherein the control unit controls the motor by operating the switching devices in such a manner that the motor never supplies electricity to the power supply system.

2. An on-vehicle actuator system according to claim 1, wherein, when the motor is generating a torque or force in a direction that reduces a revolution speed of the motor, the control unit performs control to advance or delay a phase of the 3-phase current flowing in the motor or to reduce a percentage of the generated torque with respect to an effective value of the 3-phase current of the motor, or applies a d-axis current to the motor.

3. An on-vehicle actuator system according to claim 1, wherein, when the motor is rotating in a direction opposite that of the torque or force being generated by the motor, the control unit performs control to advance or delay a phase of the 3-phase current flowing in the motor or to reduce a percentage of the generated torque with respect to an effective value of the 3-phase current of the motor, or applies a d-axis current to the motor.

4. An on-vehicle actuator system according to claim 1, wherein a semiconductor is provided between the inverter circuit and the power supply system to prevent a current from flowing from the inverter circuit to the power supply system.

5. An on-vehicle actuator system according to claim 1, wherein the power supply system can step up or step down an electricity from other power supply systems and supply it to the inverter circuit but cannot supply an electricity from the inverter circuit to the other power supply systems.

6. An on-vehicle actuator system according to claim 1,
wherein the motor is provided in an operation input device or a vehicle output device;
wherein the control unit statically generates a force or torque based on a magnitude of an operation input or vehicle output and dynamically generates a force or torque based on an amount of change in the operation input or vehicle output;
wherein the control unit controls a desired force or torque of the motor by a revolution speed.

7. An on-vehicle actuator system according to claim 1,
wherein the motor is provided in an operation input device or a vehicle output device;
wherein the motor is applied an external force from members making up the system, a human force or an external force from other actuator systems and, when the control by the inverter circuit is not performed, is rotated by the external force.

8. An on-vehicle actuator system according to claim 6,
wherein, when the motor is rotated by an external force in the same direction as the external force and generates a force or torque opposing the external force, the control unit performs control to advance or delay a phase of the 3-phase current flowing in the motor or to reduce a percentage of the generated torque with respect to an effective value of the 3-phase current of the motor, or applies a d-axis current to the motor.

9. An on-vehicle actuator system according to claim 6,
wherein, when a product of a torque and a revolution speed of the motor is negative and is greater than a predetermined threshold in a negative direction, the control unit performs control to advance or delay a phase of the 3-phase current flowing in the motor or to reduce a percentage of the generated torque with respect to an effective value of the 3-phase current of the motor, or applies a d-axis current to the motor.

10. An on-vehicle actuator system according to claim 6,
wherein, when a product of a q-axis current of the motor and a revolution speed of the motor is negative and is greater than a predetermined threshold in a negative direction, the control unit performs control to advance or delay a phase of the 3-phase current flowing in the motor or to reduce a percentage of the generated torque with respect to an effective value of the 3-phase current of the motor, or applies a d-axis current to the motor.

11. An on-vehicle actuator system according to claim 8,
wherein, when the motor is rotated by an external force and when the control unit is controlling the motor to make a revolution speed of the motor slower than that when no current is applied to the motor, the control unit performs control to advance or delay a phase of the 3-phase current flowing in the motor or to reduce a percentage of the generated torque with respect to an effective value of the 3-phase current of the motor, or applies a d-axis current to the motor.

12. An on-vehicle actuator system according to claim 8,
wherein, when the operation input unit is a pedal and when a product of a pedal step-on speed and a pedal reactionary force is negative and is greater than a predetermined threshold in a negative direction, the control unit performs control to advance or delay a phase of the 3-phase current flowing in the motor or to reduce a percentage of the generated torque with respect to an effective value of the 3-phase current of the motor, or applies a d-axis current to the motor.

13. An on-vehicle actuator system comprising:
a motor that is driven by a 3-phase current, and is operable as an electric generator or a regenerative device;
an inverter circuit having switching devices to drive the motor;
a power supply system connected to the inverter circuit to supply electricity to the motor and the inverter circuit; and
a control unit to control a current or voltage applied to the motor by controlling an operation of the switching devices;
wherein the control unit controls the motor by operating the switching devices in such a manner that the motor never generates or regenerates power at all.

14. An on-vehicle actuator system according to claim 13,
wherein, when the control unit checks, based on a q-axis current of the motor and a revolution speed of the motor, whether the motor is about to generate or regenerate power and when the control unit has decided that the motor is about to generate or regenerate power, the control unit performs control to advance or delay a phase of the 3-phase current flowing in the motor or to reduce a percentage of the generated torque with respect to an effective value of the 3-phase current of the motor, or applies a d-axis current to the motor.

15. An on-vehicle actuator system comprising:

a motor that is driven by a 3-phase current, and is operable as an electric generator or a regenerative device;

an inverter circuit having switching devices to drive the motor;

a power supply system connected to the inverter circuit to supply electricity to the motor and the inverter circuit; and a control unit to control a current or voltage applied to the motor by controlling an operation of the switching devices;

wherein the control unit calculates power of the motor and controls the motor by operating the switching devices in such a manner that the motor consumes power at all times in that its power consumption never becomes negative.

* * * * *